United States Patent
Romano et al.

(10) Patent No.: US 12,129,803 B2
(45) Date of Patent: Oct. 29, 2024

(54) GEARBOX ASSEMBLY

(71) Applicants: GE Avio S.r.l., Rivalta di Torino (IT); GE Aviation Czech s.r.o., Prague (CZ)

(72) Inventors: Aurelio Romano, Turin (IT); Juraj Hrubec, Prague (CZ); Leonardo Coviello, Bari (IT)

(73) Assignees: GE AVIO S.R.L, Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 18/452,882

(22) Filed: Aug. 21, 2023

(65) Prior Publication Data
US 2024/0229722 A1    Jul. 11, 2024

(30) Foreign Application Priority Data
Jan. 11, 2023   (IT) .................. 102023000000246

(51) Int. Cl.
*F02C 7/36*   (2006.01)

(52) U.S. Cl.
CPC ...... *F02C 7/36* (2013.01); *F05D 2260/40311* (2013.01)

(58) Field of Classification Search
CPC ................ F02C 7/36; F05D 2260/40311
See application file for complete search history.

(56) References Cited

U.S. PATENT DOCUMENTS

| | | | |
|---|---|---|---|
| 8,172,717 B2 | 5/2012 | Lopez et al. |
| 9,523,424 B2 | 12/2016 | Altamura |
| 9,797,475 B2 | 10/2017 | Altamura |
| 10,267,365 B2 | 4/2019 | Hasting |
| 2016/0252176 A1 | 9/2016 | van der Merwe et al. |
| 2021/0388770 A1 | 12/2021 | Hrubec et al. |

FOREIGN PATENT DOCUMENTS

| | | |
|---|---|---|
| EP | 2674358 A2 | 12/2013 |
| EP | 2836694 B1 | 6/2016 |
| EP | 2998615 B1 | 7/2019 |
| GB | 691775 A | 5/1953 |

*Primary Examiner* — Courtney D Heinle
*Assistant Examiner* — John S Hunter, Jr.
(74) *Attorney, Agent, or Firm* — Venable LLP; Peter T. Hrubiec; Michele V. Frank

(57) ABSTRACT

A gearbox assembly includes a plurality of planet gears and a planet carrier including a plurality of planet gear pockets. Each planet gear is mounted in a respective planet gear pocket about a pin. The planet carrier is characterized by a planet carrier envelope in a range of 2.7 and 4.50. The planet carrier envelope is equal to a product of a planet gear pocket aspect ratio multiplied by a planet carrier radial ratio. The planet gear pocket aspect ratio is $D_p/L$. The planet carrier radial ratio is D/aw. $D_p$ is a planet gear pocket diameter of the plurality of planet gear pockets, L is a planet gear pocket length of the plurality of planet gear pockets, D is a planet carrier diameter of the planet carrier, and aw is a pin center distance from a longitudinal axis of the planet carrier to an axis of the pin.

20 Claims, 10 Drawing Sheets

GEARBOX ASSEMBLY

CROSS REFERENCE TO RELATED APPLICATIONS

Technical Field

The present application claims the benefit of Italian Patent Application No. 102023000000246, filed on Jan. 11, 2023, which is hereby incorporated by reference herein in its entirety.

Technical Field

The present disclosure relates generally to gearbox assemblies for engines, such as turbine engines.

BACKGROUND

An engine, such as a turbine engine, may generally include a fan and a turbomachine arranged in flow communication with one another. The engine may include one or more gearbox assemblies.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
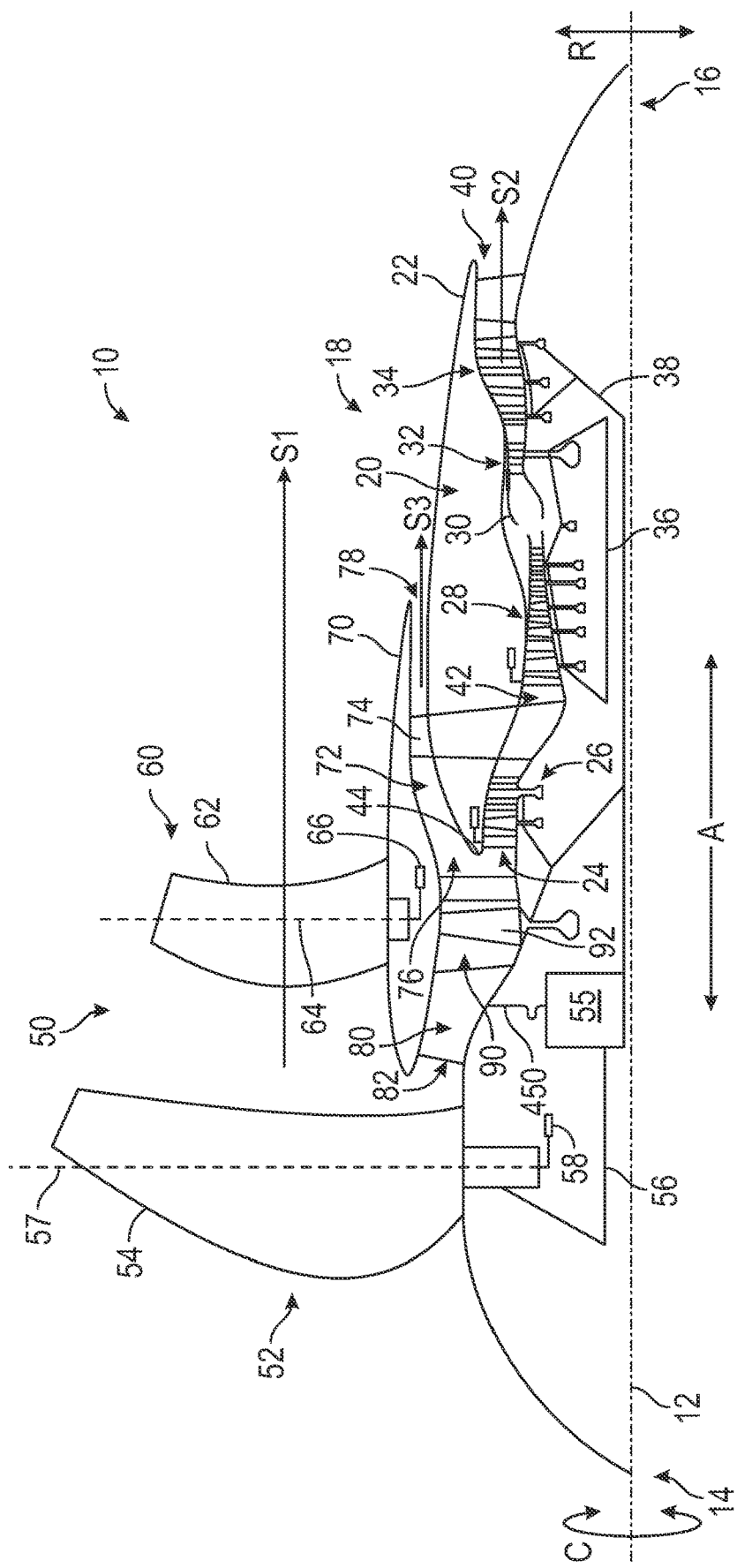
FIG. 1 is a schematic, cross-sectional diagram of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within an engine or a vehicle, and refer to the normal operational attitude of the engine or the vehicle. For example, with regard to an engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for engines, such as unducted single fan (USF) engines, with a high-speed low-pressure turbine and a variable pitch propeller or fan. USF engines provide for a high power rating. Such engines can be configured as a geared engine that includes a power gearbox utilized to transfer power from a turbine shaft, such as a low-pressure shaft, to the propeller or the fan. Power gearboxes can also be utilized in other sections of the engine. In such high power engines, however, a high gear ratio is needed to drive the propeller at the required speed and torque. For example, the gear ratio of the power gearbox between the low-pressure turbine and the propeller can be in a range of 6:1 and 12:1. While the present disclosure refers to USF engines, the embodiments detailed herein may be utilized for other types of turbine engines with high gear ratios.

Power gearboxes may include a sun gear, a plurality of planet gears, and a ring gear. The sun gear meshes with the plurality of planet gears and the plurality of planet gears mesh with the ring gear. In operation, the power gearbox transfers the torque transmitted from the turbine shaft operating at a first speed to a fan shaft rotating at a second, lower speed. The sun gear may be coupled to the low-pressure shaft of the turbine rotating at the first speed. In a planet configuration of the power gearbox, the plurality of planet gears, intermeshed with the sun gear, then transfer this torque to the fan shaft through a planet carrier. In a star configuration, the ring gear is coupled to the fan shaft. In either configuration, the plurality of planet gears may include compound gears such that the plurality of planet gears each includes a first stage and a second stage. The first stage is meshed with the sun gear and the second stage is meshed with the ring gear.

The power gearbox includes a planet carrier that contains the plurality of planet gears therein. In the star configuration, the planet carrier is coupled to a static structure of the turbine engine such that the planet carrier is held stationary while the plurality of planet gears rotate about their own axis within the planet carrier. During operation of the power gearbox, the torque applied on the planet gears causes a torque to be applied on the planet carrier. For example, the torque of the rotating planet gears is transferred and absorbed by the planet carrier. The reaction torque absorbed by the planet carrier causes the planet carrier to twist or otherwise attempt to rotate with respect to the static structure. In this way, the torque on the planet carrier causes stress through the planet carrier and at the coupling to the static structure. Thus, reliability and a lifecycle of the planet carrier is reduced if the planet carrier is unable to adequately absorb the torque. As engines increase in power and thrust, the torque on the planet carrier described becomes more challenging to accommodate, while at the same time, minimizing the overall weight of the engine while increasing engine efficiency of the engine.

One way to minimize overall weight of the engine is to minimize the weight of the power gearbox by making the power gearbox smaller. The inventors, seeking a need to improve upon the existing planet carriers for power gearboxes, designed several different configurations of the planet carriers in an effort to improve upon the size, the weight, and the efficiency of a power gearbox, thereby improving upon the size, the weight, and the efficiency of the engine, while accounting for the torques on the planet carrier and balancing structural integrity of the planet carrier, assembly of the planet gears within the planet carrier, reliability of the planet carrier, and weight of the planet carrier, and therefore of the power gearbox.

Referring now to the drawings, FIG. 1 is a schematic, cross-sectional diagram of a turbine engine 10, taken along a centerline axis of the turbine engine 10, according to the present disclosure. Particularly, FIG. 1 provides an aviation three-stream turbofan engine also referred to as a "three-stream engine." The turbine engine 10 of FIG. 1 can be mounted to an aerial vehicle, such as a fixed-wing aircraft, and can produce thrust for propulsion of the aerial vehicle.

The turbine engine 10 is a "three-stream engine" in that its architecture provides three distinct streams of thrust-producing airflow during operation, as detailed further below.

As shown in FIG. 1, the turbine engine 10 defines an axial direction A, a radial direction R, and a circumferential direction C. Moreover, the turbine engine 10 defines an axial centerline or a longitudinal axis 12 that extends along the axial direction A. In general, the axial direction A extends parallel to the longitudinal axis 12, the radial direction R extends outward from, and inward to, the longitudinal axis 12 in a direction orthogonal to the axial direction A, and the circumferential direction C extends three hundred sixty degrees (360°) around the longitudinal axis 12. The turbine engine 10 extends between a forward end 14 and an aft end 16, e.g., along the axial direction A.

The turbine engine 10 includes a turbomachine 18 and a fan section 50 positioned upstream thereof. Generally, the turbomachine 18 includes, in serial flow order, a compressor section, a combustion section, a turbine section, and an exhaust section. Particularly, as shown in FIG. 1, the turbomachine 18 includes an engine core 20 and a core cowl 22 that annularly surrounds the turbomachine 18. The turbomachine 18 and the core cowl 22 define a core inlet 24 that is annular. The core cowl 22 further encloses and supports a booster or a low pressure (LP) compressor 26 for pressurizing the air that enters the turbomachine 18 through core inlet 24. The engine core 20 includes a high pressure (HP) compressor 28, a combustor 30, and a high pressure (HP) turbine 32. The HP compressor 28 receives pressurized air from the LP compressor 26 and further increases the pressure of the air. The pressurized air flows downstream to the combustor 30 where fuel is injected into the pressurized air and ignited to raise the temperature and the energy level of the pressurized air, thereby generating combustion gases.

The combustion gases flow from the combustor 30 downstream to the HP turbine 32. The HP turbine 32 drives the HP compressor 28 through a first shaft, also referred to as a high pressure (HP) shaft 36. In this regard, the HP turbine 32 is drivingly coupled with the HP compressor 28. The combustion gases then flow to a low pressure (LP) turbine 34. The LP turbine 34 drives the LP compressor 26 and components of the fan section 50 through a second shaft, also referred to as a low pressure (LP) shaft 38. In this regard, the LP turbine 34 is drivingly coupled with the LP compressor 26 and components of the fan section 50. The LP shaft 38 is coaxial with the HP shaft 36 in the embodiment of FIG. 1. After driving each of the HP turbine 32 and the LP turbine 34, the combustion gases exit the turbomachine 18 through a core exhaust nozzle 40 to produce propulsive thrust. Accordingly, the turbomachine 18 defines a core flowpath, also referred to as a core duct 42, that extends between the core inlet 24 and the core exhaust nozzle 40. The core duct 42 is an annular duct positioned generally inward of the core cowl 22 along the radial direction R.

The fan section 50 includes a primary fan 52. For the embodiment of FIG. 1, the primary fan 52 is an open rotor fan, also referred to as an unducted fan. However, in other embodiments, the primary fan 52 may be ducted, e.g., by a fan casing or a nacelle circumferentially surrounding the primary fan 52. The primary fan 52 includes an array of fan blades 54 (only one shown in FIG. 1). The fan blades 54 are rotatable about the longitudinal axis 12 via a fan shaft 56. As shown in FIG. 1, the fan shaft 56 is coupled with the LP shaft 38 via a speed reduction gearbox, also referred to as a gearbox assembly 55, e.g., in an indirect-drive configuration. The gearbox assembly 55 is shown schematically in FIG. 1. The gearbox assembly 55 is coupled to the turbine engine 10 by a static structure 450, as detailed further below. The gearbox assembly 55 includes a plurality of gears for adjusting the rotational speed of the fan shaft 56 and, thus, the primary fan 52 relative to the LP shaft 38 to a more efficient rotational fan speed.

The fan blades 54 can be arranged in equal spacing around the longitudinal axis 12. Each fan blade 54 has a root and a tip, and a span defined therebetween. Each fan blade 54 defines a central blade axis 57. For the embodiment of FIG. 1, each fan blade 54 of the primary fan 52 is rotatable about their respective central blade axis 57, e.g., in unison with one another. One or more actuators 58 are controlled to pitch the fan blades 54 about their respective central blade axis 57. In other embodiments, each fan blade 54 is fixed or is unable to be pitched about the central blade axis 57.

The fan section 50 further includes a fan guide vane array 60 that includes fan guide vanes 62 (only one shown in FIG. 1) disposed around the longitudinal axis 12. For the embodiment of FIG. 1, the fan guide vanes 62 are not rotatable about the longitudinal axis 12. Each fan guide vane 62 has a root and a tip, and a span defined therebetween. The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about their respective central vane axis 64, e.g., in unison with one another. One or more actuators 66 are controlled to pitch the fan guide vanes 62 about their respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters through the fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the longitudinal axis 12. The plurality of struts 74 are each aerodynamically contoured to direct air flowing thereby. Other struts in addition to the plurality of struts 74 can be used to connect and support the fan cowl 70 and/or the core cowl 22.

The turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 44 of the core cowl 22. The inlet duct 80 is wider than the core duct 42 along the radial direction R. The inlet duct 80 is also wider than the fan duct 72 along the radial direction R.

The fan section 50 also includes a mid-fan 90. The mid-fan 90 includes a plurality of mid-fan blades 92 (only one shown in FIG. 1). The plurality of mid-fan blades 92 are rotatable, e.g., about the longitudinal axis 12. The mid-fan 90 is drivingly coupled with the LP turbine 34 via the LP shaft 38. The plurality of mid-fan blades 92 can be arranged in equal circumferential spacing about the longitudinal axis 12. The plurality of mid-fan blades 92 are annularly surrounded (e.g., ducted) by the fan cowl 70. In this regard, the mid-fan 90 is positioned inward of the fan cowl 70 along the radial direction R. The mid-fan 90 is positioned within the inlet duct 80 upstream of both the core duct 42 and the fan duct 72.

Accordingly, air flowing through the inlet duct 80 flows across the plurality of mid-fan blades 92 and is accelerated downstream thereof. At least a portion of the air accelerated by the mid-fan blades 92 flows into the fan duct 72 and is ultimately exhausted through the fan exhaust nozzle 78 to produce propulsive thrust. Also, at least a portion of the air accelerated by the plurality of mid-fan blades 92 flows into the core duct 42 and is ultimately exhausted through the core exhaust nozzle 40 to produce propulsive thrust. Generally, the mid-fan 90 is a compression device positioned downstream of the engine inlet 82. The mid-fan 90 is operable to accelerate air into the fan duct 72, also referred to as a secondary bypass passage.

During operation of the turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or a first thrust stream S1. A majority of the net thrust produced by the turbine engine 10 is produced by the first thrust stream S1. The second airflow enters the inlet duct 80 through the engine inlet 82.

The second airflow flowing downstream through the inlet duct 80 flows through the plurality of mid-fan blades 92 of the mid-fan 90 and is consequently compressed. The second airflow flowing downstream of the mid-fan 90 is split by the splitter 44 located at the forward end of the core cowl 22. Particularly, a portion of the second airflow flowing downstream of the mid-fan 90 flows into the core duct 42 through the core inlet 24. The portion of the second airflow that flows into the core duct 42 is progressively compressed by the LP compressor 26 and the HP compressor 28, and is ultimately discharged into the combustion section. The discharged pressurized air stream flows downstream to the combustor 30 where fuel is introduced to generate combustion gases or products.

The combustor 30 defines an annular combustion chamber that is generally coaxial with the longitudinal axis 12. The combustor 30 receives pressurized air from the HP compressor 28 via a pressure compressor discharge outlet. A portion of the pressurized air flows into a mixer. Fuel is injected by a fuel nozzle to mix with the pressurized air thereby forming a fuel-air mixture that is provided to the combustion chamber for combustion. Ignition of the fuel-air mixture is accomplished by one or more igniters, and the resulting combustion gases flow along the axial direction A toward, and into, a first stage turbine nozzle of the HP turbine 32. The first stage turbine nozzle is defined by an annular flow channel that includes a plurality of radially extending, circumferentially spaced nozzle vanes that turn the combustion gases so that they flow angularly and impinge upon first stage turbine blades of the HP turbine 32. The combustion gases exit the HP turbine 32, flow through the LP turbine 34, and exit the core duct 42 through the core exhaust nozzle 40 to produce a core air stream, also referred to as a second thrust stream S2. As noted above, the HP turbine 32 drives the HP compressor 28 via the HP shaft 36, and the LP turbine 34 drives the LP compressor 26, the primary fan 52, and the mid-fan 90 via the LP shaft 38.

The other portion of the second airflow flowing downstream of the mid-fan 90 is split by the splitter 44 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as a third thrust stream S3.

The third thrust stream S3 means a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The turbine engine 10 depicted in FIG. 1 is by way of example only. In other embodiments, the turbine engine 10 may have any other suitable configuration. For example, in other embodiments, the primary fan 52 may be configured in any other suitable manner (e.g., as a fixed pitch fan) and further may be supported using any other suitable fan frame configuration. In other embodiments, the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Figure 2:
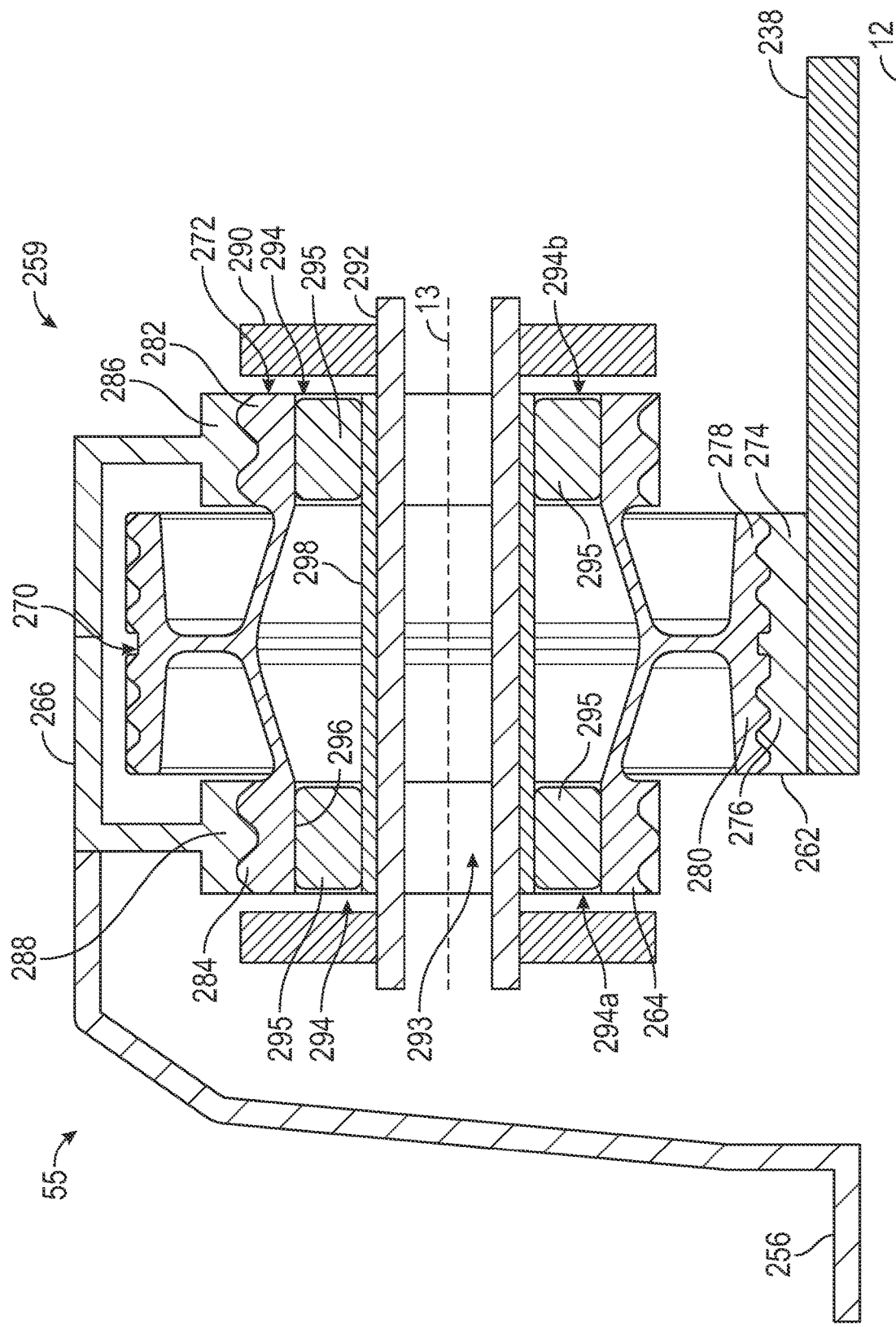
FIG. 2 is a schematic, cross-sectional side view of a gearbox assembly for a turbine engine, taken along a centerline axis of the turbine engine, according to the present disclosure.

FIG. 2 is a schematic, cross-sectional side view of the gearbox assembly 55, taken along the longitudinal axis 12, according to the present disclosure. The gearbox assembly 55 includes an epicyclic gear assembly 259 in a compound symmetrical arrangement. The epicyclic gear assembly 259 includes a sun gear 262, a plurality of planet gears 264 (only one of which is visible in FIG. 2), and a ring gear 266. For clarity, only a portion of the gears is shown. The plurality of planet gears 264 are contained and supported by a planet carrier 290 (shown schematically in FIG. 2). The gearbox assembly 55 is a star type configuration or a rotating ring gear type gearbox assembly (e.g., the ring gear 266 is rotating and the planet carrier 290 is fixed and stationary). In such an arrangement, the primary fan 52 (FIG. 1) is driven by the ring gear 266. In this way, the ring gear 266 is an output of the gearbox assembly 55. However, other suitable types of gearbox assemblies may be employed. In one non-limiting embodiment, the gearbox assembly 55 may be a planetary configuration, in which the ring gear 266 is held fixed, with the planet carrier 290 allowed to rotate. In such an arrangement, the primary fan 52 (FIG. 1) is driven by the planet carrier 290. In this way, the plurality of planet gears 264 are the output of the gearbox assembly 55.

An input shaft 238 is coupled to the sun gear 262. The input shaft 238 is coupled to the turbine section (FIG. 1). For example, the input shaft 238 can be coupled to, or can embody, the LP shaft 38 (FIG. 1). Radially outward of the sun gear 262, and intermeshing therewith, is the plurality of planet gears 264 that are coupled together and supported by the planet carrier 290. The planet carrier 290 supports and constrains the plurality of planet gears 264 such that the plurality of planet gears 264 do not together rotate around the sun gear 262 while enabling each planet gear 264 of the plurality of planet gears 264 to rotate about a central axis 13 of each planet gear 264. Radially outwardly of the plurality of planet gears 264, and intermeshing therewith, is the ring gear 266, which is an annular ring gear. FIG. 2 shows the ring gear 266 is formed of two separate components that are coupled together. In some embodiments, the ring gear 266 may be a single unitary component. The ring gear 266 is coupled via an output shaft 256 to the primary fan 52 (FIG. 1) and rotates to drive rotation of the primary fan 52 (FIG. 1) about the longitudinal axis 12. For example, the output shaft 256 is coupled to the fan shaft 56 (FIG. 1). In some embodiments, the output shaft 256 and the fan shaft 56 (FIG. 1) are formed as a single integral component.

Each of the plurality of planet gears 264 is a compound gear that includes a first stage planet gear 270 and a second stage planet gear 272 coupled together. The first stage planet gear 270 includes a greater diameter than a diameter of the second stage planet gear 272. Each of the sun gear 262, the plurality of planet gears 264, and the ring gear 266 comprises teeth about their periphery to intermesh with the other gears. For example, each of the sun gear 262, the plurality of planet gears 264, and the ring gear 266 is a double helical gear with first and second sets of helical teeth that are all inclined at the same acute angle relative to a planet gear axis. In particular, the sun gear 262 comprises a first set of sun gear teeth 274 and a second set of sun gear teeth 276. Each of the first stage planet gears 270 includes a first set of planet gear teeth 278 and a second set of planet gear teeth 280, and each of the second stage planet gears 272 includes a third set of planet gear teeth 282 and a fourth set of planet gear teeth 284. The ring gear 266 includes a first set of ring gear teeth 286 and a second set of ring gear teeth 288. The sun gear 262, the plurality of planet gears 264, and the ring gear 266 may include any type of gear, such as, for example, spur gears (e.g., gear teeth that are straight cut and are not set at an angle relative to the planet gear axis), or the like.

The first set of planet gear teeth 278 and the second set of planet gear teeth 280 of the first stage planet gear 270 mesh with the first set of sun gear teeth 274 and the second set of sun gear teeth 276 of the sun gear 262, respectively. The third set of planet gear teeth 282 of the second stage planet gear 272 meshes with the first set of ring gear teeth 286 of the ring gear 266. The fourth set of planet gear teeth 284 of the second stage planet gear 272 meshes with the second set of ring gear teeth 288 of the ring gear 266.

Each of the planet gears 264 of the plurality of planet gears 264 includes a pin 292 about which a respective planet gear 264 rotates. The pin 292 is coupled to the planet carrier 290 and is disposed within a bore 293 of a respective planet gear 264. Lubricant (e.g., oil) is provided between the pin 292 and a respective planet gear 264 such that the planet gear 264 rotates with respect to the pin 292. The second stage planet gear 272 is supported by one or more roller bearings 294 that are disposed within the bore 293. FIG. 2 shows the one or more roller bearings 294 include two roller bearings 294 including a first roller bearing 294a and a second roller bearing 294b. A respective planet gear 264, however, can include any number of roller bearings 294, as desired. The second roller bearing 294b is located aft of the first roller bearing 294a. In this way, the first roller bearing 294a is referred to as a forward roller bearing and the second roller bearing 294b is referred to as an aft roller bearing. The roller bearings 294 allow rotation of the planet gear 264 with respect to the pin 292.

The one or more roller bearings 294 include an outer race 296 and an inner race 298. The outer race 296 is defined by a radially inner surface of the second stage planet gear 272. In some embodiments, the outer race 296 is a separate component from the second stage planet gear 272. The inner race 298 is coupled to the pin 292. The one or more roller bearings 294 include a plurality of rolling elements 295 disposed between the outer race 296 and the inner race 298. FIG. 2 shows four such rolling elements 295, but the one or more roller bearings 294 may each include any number of rolling elements 295. The plurality of rolling elements 295 allows rotation of the planet gear 264 with respect to the pin 292. The plurality of rolling elements 295 includes generally cylindrical rolling elements. The plurality of rolling elements 295, however, may include ball bearing elements, tapered rolling elements, needle rolling elements, or the like.

The gearbox assembly 55 includes a gear ratio that defines a ratio of the speed of the input gear (e.g., the sun gear 262) to the speed of the output (e.g., the ring gear 266) through the gearbox assembly 55. Embodiments of the present disclosure detailed herein provide for increased gear ratios for a fixed gear envelope (e.g., with the same size ring gear), or alternatively, a smaller diameter ring gear may be used to achieve the same gear ratios. Thus, the embodiments disclosed herein allow for gear ratios suitable for large diameter engines, or for smaller diameter engines. A total gear ratio of the planet gear 264 includes a first gear ratio of the first stage planet gear 270 and a second gear ratio of the second stage planet gear 272. The first gear ratio of the first stage planet gear 270 is less than the second gear ratio of the second stage planet gear 272. In some embodiments, the first gear ratio of the first stage planet gear 270 is greater than or equal to the second gear ratio of the second stage planet gear 272. In this way, a split of the total gear ratio between the first gear ratio and the second gear ratio can be selected for a particular application as desired. The total gear ratio of the planet gear 264 is in a range of six to one (6:1) and twelve to one (12:1). The total gear ratio is selected based on engine size and power requirements, and a selection of components for a particular gearbox assembly 55. For example, the total gear ratio is based on the speed of the primary fan 52 (e.g., the tip speed of the primary fan 52 of FIG. 1) and the speed of the LP turbine 34 (e.g., based on the number of stages of the LP turbine 34 of FIG. 1).

Figure 3A:
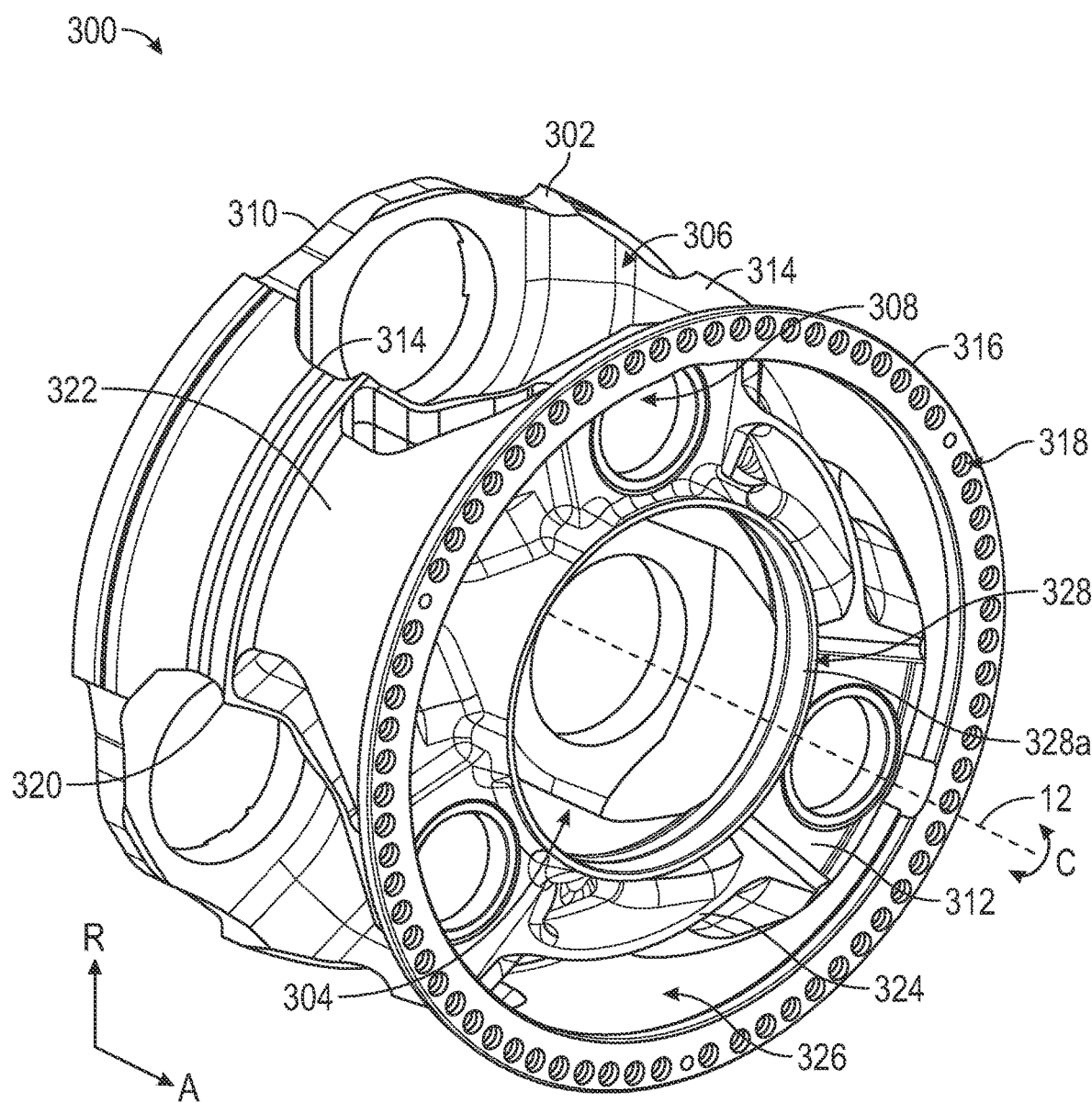
FIG. 3A illustrates a planet carrier for a gearbox assembly of a turbine engine, according to the present disclosure.

FIG. 3A shows a planet carrier 300 for a gearbox assembly of a turbine engine, according to the present disclosure. The planet carrier 300 can be utilized as the planet carrier 290 of FIG. 2 and/or in the turbine engine 10 of FIG. 1. The planet carrier 300 has a carrier body 302 that includes a sun gear opening 304, a plurality of planet gear pockets 306, and a plurality of pin apertures 308. The carrier body 302 is made from, for example, metals, alloys, composites, or the like. In some embodiments, the carrier body 302 is made from titanium cast alloy. The carrier body 302 is a generally cylindrical body and includes a forward wall 310 and an aft wall 312. The forward wall 310 and the aft wall 312 are generally annular about the longitudinal axis 12. When the gearbox assembly is assembled within a turbine engine, the forward wall 310 is positioned forward of the aft wall 312. The forward wall 310 and the aft wall 312 are interconnected by sidewalls 314 that extend axially from the forward wall 310 to the aft wall 312.

The planet carrier 300 includes a coupling portion 316 at the aft wall 312 that extends radially outward from the carrier body 302. The coupling portion 316 defines a coupling for connecting the planet carrier 300 to a member, e.g., to an output shaft or to a static structure, as detailed further below. In the embodiment of FIG. 3A, the coupling portion 316 is a flange having a plurality of fastening openings 318 for receiving fastening mechanisms, such as, for example, screws or bolts, to couple the planet carrier 300 to the output shaft or to the static structure. In some embodiments, the coupling portion 316 is defined by a hole spline or a shaft spline for coupling the planet carrier 300 to the output shaft or to the static structure in a splined connection.

The plurality of planet gears 264 (FIG. 2) are each mounted and disposed in a respective planet gear pocket 306 and the pin 292 (FIG. 2) of each planet gear 264 is disposed through a respective pin aperture 308 when the gearbox assembly is assembled, as detailed further below. Although three planet gear pockets 306 are shown in FIG. 3A, the planet carrier 300 can include any number of planet gear pockets 306 for mounting any number of planet gears therein, as desired. The plurality of planet gear pockets 306 are defined by the forward wall 310, the aft wall 312, and a pair of the sidewalls 314 of the carrier body 302. Each planet gear pocket 306 has respective pin apertures 308 associated therewith in the forward wall 310 and in the aft wall 312 for receiving a respective pin 292 (FIG. 2). In this way, each pin 292 extends axially within a respective planet gear pocket 306.

The planet carrier 300 also includes a center plate structure as an integral part of the structure of the carrier body 302. The center plate structure is segmented into a plurality of center plates 320 (only one shown in the view of FIG. 3A). Each center plate 320 is an arc-shaped portion of a circular disk, and lies substantially in a radial plane (e.g., is parallel to the forward wall 310 and to the aft wall 312). Each center plate 320 spans the space between a pair of planet gear pockets 306, connecting to adjacent ones of the sidewalls 314. In the embodiment of FIG. 3A, the center plates 320 are located axially approximately halfway between the forward wall 310 and the aft wall 312. The axial location of the center plates 320 can be adjusted as desired. In particular, misalignment in the planet carrier 300 can be controlled through placement of the axial location of the center plates 320. For example, locating the center plates 320 axially halfway between the forward wall 310 and the aft wall 312 balances the planet carrier 300 axially centrally. Locating the center plates 320 forward of the axial halfway point balances the planet carrier 300 forward, and locating the center plates 320 aft of the axial halfway point balances the planet carrier 300 aft.

A plurality of torque fingers 322 extend axially between the coupling portion 316 and the center plate structure. One torque finger 322 is provided for each of the center plates 320. Each torque finger 322 is functionally integral with a respective center plate 320 and the coupling portion 316. For example, each torque finger 322 is constructed as part of an integral (e.g., monolithic) component with the respective center plate 320 and the coupling portion 316. In some embodiments, each torque finger 322 is a separate component that is assembled to the respective center plate 320 and the coupling portion 316 (e.g., via welding, fastening mechanisms, or the like). In operation, the plurality of planet gears 264 (FIG. 2) transfer large tangential forces (e.g., in the circumferential direction C) into the planet carrier 300, thereby causing the planet carrier 300 to tend to rotate relative to the coupling portion 316. This rotation results in elastic bending of the plurality of torque fingers 322 in the circumferential direction C. The plurality of center plates 320 deflect to accommodate the bending of the plurality of torque fingers 322. In this way, the plurality of center plates 320 absorb the torque as strain energy and isolate the movement of the plurality of torque fingers 322 from the planet carrier 300. Such an arrangement helps to avoid distortion of the planet carrier 300 and consequent misalignment of the bearings (e.g., the roller bearings 294 of FIG. 2) and changing gear operating clearances. The plurality of torque fingers 322 and the plurality of center plates 320 are sized and shaped such that the stresses in each will remain in the elastic range for the expected operating loads.

The planet carrier 300 also includes a plurality of ribs 324 formed integrally with the carrier body 302. The plurality of ribs 324 are disposed at, and form a part of, the aft wall 312. Each rib 324 is disposed between a pair of the planet gear pockets 306. For example, each rib 324 extends circumferentially between a pair of the planet gear pockets 306 such that each pair of the planet gear pockets 306 are connected. In this way, one or more spaces 326 are formed circumferentially between each of the plurality of planet gear pockets 306 at the aft wall 312. The plurality of ribs 324 are disposed in the one or more spaces 326 and support the plurality of planet gear pockets 306 at the aft wall 312 to stiffen the aft wall 312. In this way, the plurality of ribs 324 help to limit a deflection of the aft wall 312 in the circumferential direction C during operation. The plurality of ribs 324 are located radially inward of the coupling portion 316.

Figure 4A:
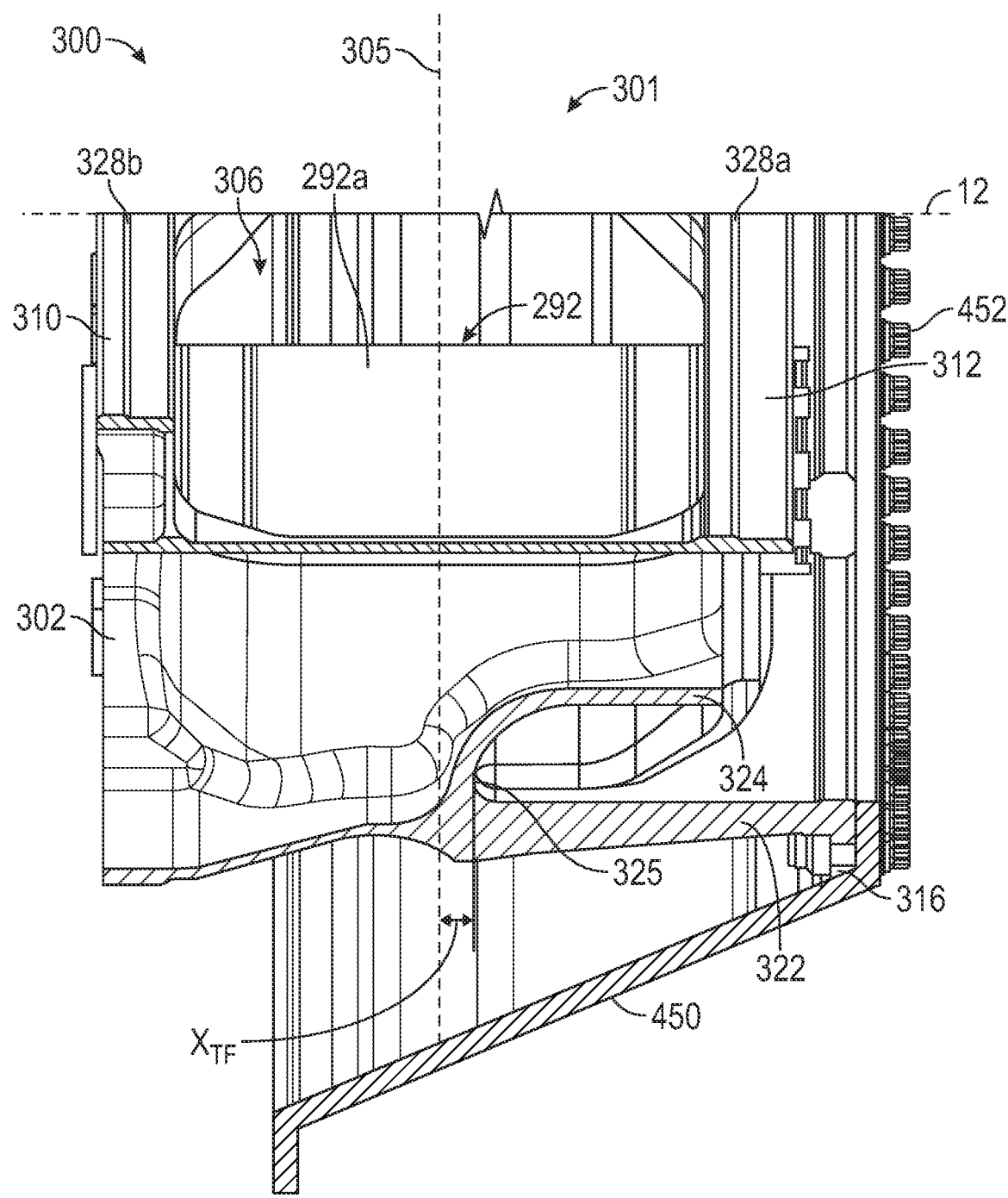
FIG. 4A is a schematic, cross-sectional diagram of the planet carrier of FIG. 3A coupled to a static structure, taken along the longitudinal axis of the planet carrier, and showing a bottom portion of the planet carrier below the longitudinal axis, according to the present disclosure.

The sun gear opening 304 is generally cylindrical and defines an inner diameter of the carrier body 302 at the aft wall 312. The forward wall 310 can include a similar opening such that the forward wall 310 also defines an inner diameter of the carrier body 302. The sun gear opening 304 receives the sun gear 262 (FIG. 2) therethrough such that the sun gear 262 is disposed at an axial center and at a radial center of the carrier body 302. The planet carrier 300 includes a plurality of cylindrical interfaces 328 disposed about the inner diameter of the carrier body 302. The plurality of cylindrical interfaces 328 are disposed radially inward of the plurality of ribs 324. For example, the sun gear opening 304 includes a first cylindrical interface 328a and the inner diameter of the forward wall 310 includes a second cylindrical interface 328b (FIG. 4A). Each cylindrical interface 328, together with a seal (e.g., an O-ring), forms a manifold (e.g., a sealed, pressurized chamber) for receiving lubricant (e.g., oil) therein for distributing the lubricant to various components of the gearbox assembly for lubricating the components (e.g., gears and/or bearings) of the gearbox assembly 55 (FIG. 2).

Figure 3C:
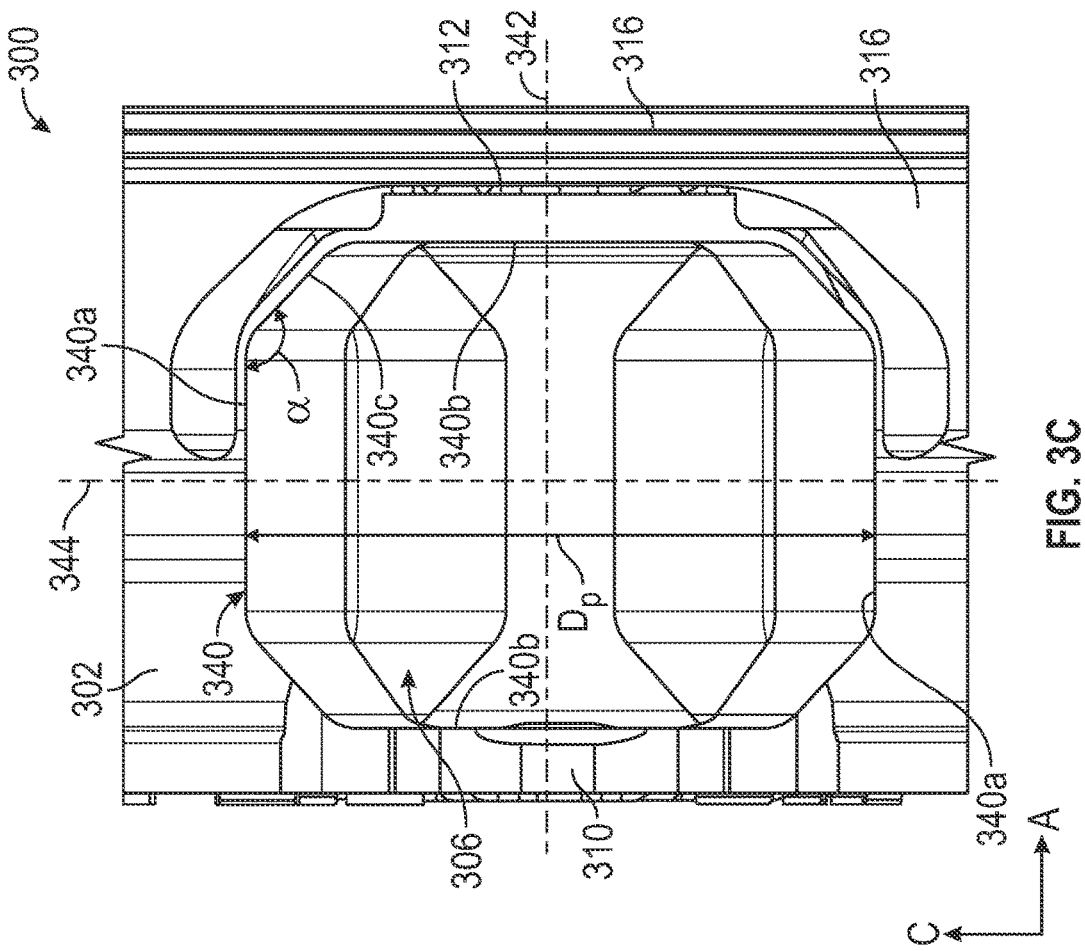
FIG. 3C is a top elevation view of the planet carrier of FIG. 3B showing a planet gear pocket of the planet carrier, according to the present disclosure.
Figure 3B:
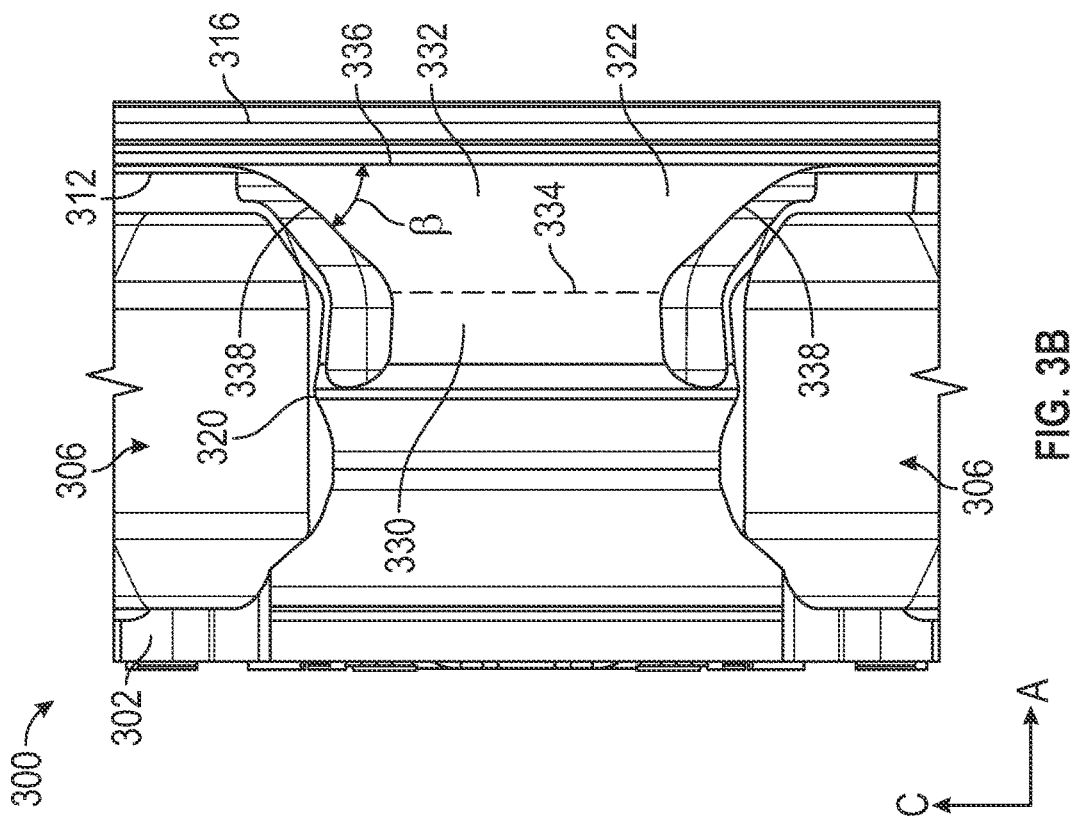
FIG. 3B is a top elevation view of the planet carrier of FIG. 3A showing a torque finger of the planet carrier, according to the present disclosure.

FIG. 3B is a top elevation view of the planet carrier 300 showing one of the torque fingers 322, according to the present disclosure. As shown in FIG. 3B, each torque finger 322 includes a first portion 330 and a second portion 332. The first portion 330 and the second portion 332 are separated by an imaginary line 334. The first portion 330 is axially closer to the center plate 320 and the second portion 332 is axially closer to the coupling portion 316.

The second portion 332 of each torque finger 322 defines a generally trapezoidal shape. In this way, the second portion 332 includes a first base 336 and a second base defined by the imaginary line 334. The first base 336 and the second base are connected by a pair of legs 338 that are defined by circumferentially spaced sides of the torque finger 322. The first base 336 is formed integrally with the coupling portion 316.

Each leg 338 extends from the first base 336 (e.g., extends from the coupling portion 316) in the axial direction at a base angle, also referred to as a torque finger angle $\beta$. The torque finger angle $\beta$ is in a range of thirty degrees (30°) and eighty degrees (80°). Changing the torque finger angle $\beta$ changes the size (e.g., in the circumferential direction C) and the stiffness of the torque finger 322. For example, values of the torque finger angle $\beta$ that are closer to 30° allow for a larger torque finger 322 (e.g., more material in the circumferential direction), thereby increasing an overall weight of the planet carrier 300, and increasing the stiffness of the torque finger 322. Values of the torque finger angle $\beta$ that are closer to 80° allow for a smaller torque finger 322 (e.g., less material in the circumferential direction), thereby reducing the overall weight of the planet carrier 300, and decreasing the stiffness of the torque finger 322. Therefore, the torque finger angle $\beta$ is selected to reduce the overall weight of the planet carrier 300, while accounting for the stiffness of the torque fingers 322 to adequately accommodate the torque absorbed by the torque fingers 322 from the plurality of planet gears 264 (FIG. 2) during operation.

FIG. 3C is a top elevation view of the planet carrier 300 showing one of the planet gear pockets 306, according to the present disclosure. As shown in FIG. 3C, the planet gear pocket 306 includes a generally octagonal shape having eight sides 340. For example, the planet gear pocket 306 includes a pair of axially-extending sides 340a that are circumferentially spaced from each other, a pair of circumferentially-extending sides 340b that are axially spaced from each other, and four angled sides 340c that each extends at a planet gear pocket angle $\alpha$ between the axially-extending sides 340a and the circumferentially-extending sides 340b. In some embodiments, the edges of the planet gear pockets 306 and/or the connections between the four angled sides 340c and the axially-extending sides 340a and the circumferentially-extending sides 340b are chamfered to create a symmetrical sloping edge or corner. The generally octagonal shape of the planet gear pocket 306 is an irregular octagonal shape such that the sides of the octagon are unequal. The generally octagonal shape of the planet gear pocket 306 is symmetrical in two directions. For example, the generally octagonal shape of the planet gear pocket 306 is vertically symmetrical in the circumferential direction C along line 342 and is horizontally symmetrical in the axial direction A along line 344.

The planet gear pocket 306 defines a planet gear pocket diameter $D_p$ in the circumferential direction C. The planet gear pocket diameter $D_p$ is a maximum between the pair of axially-extending sides 340a, and the planet gear pocket diameter $D_p$ varies along the angled sides 340c. For example, the planet gear pocket diameter $D_p$ decreases along the angled sides 340c from the axially-extending sides 340a to the circumferentially-extending sides 340b. In this way, the planet gear pocket 306 accommodates a respective planet gear 264 (FIG. 2) therein such that the respective planet gear 264 does not contact the sides 340. The first stage planet gear 270 (FIG. 2) is disposed circumferentially between the pair of axially-extending sides 340a and the second stage planet gear 272 (FIG. 2) is disposed circumferentially between the four angled sides 340c. In this way, the larger diameter of the first stage planet gear 270 is accommodated within the maximum of the planet gear pocket diameter $D_p$ of the axially-extending sides 340a and the smaller diameter of the second stage planet gear 272 is accommodated within the varying planet gear pocket diameter $D_p$ of the four angled sides 340c. Such a configuration and shape of the planet gear pocket 306 allows for reducing a size of the planet gear pocket 306, thereby reducing an overall size and an overall weight of the planet carrier 300 as compared to planet carriers without the benefit of the present disclosure.

The planet gear pocket angle α is in a range of one hundred degrees (100°) and one hundred seventy degrees (170°). Changing the planet gear pocket angle α changes the size of the planet gear pocket 306, thereby changing the overall weight and stiffness of the planet carrier 300. For example, values of the planet gear pocket angle α that are closer to one hundred degrees (100°) allow for a smaller planet gear pocket 306, thereby reducing overall weight of the planet carrier 300. Values of the planet gear pocket angle α that are closer to one hundred seventy degrees (170°) increase the size of the planet gear pocket 306, thereby increasing the overall weight of the planet carrier 300. Further, changing the size of the planet gear pocket 306 affects the size of the torque fingers 322. For example, increasing the planet gear pocket angle α increases the torque finger angle β and decreasing the planet gear pocket angle α decreases the torque finger angle β. Accordingly, the planet gear pocket angle α is selected to reduce the size of the planet gear pocket 306 while being able to accommodate the respective planet gear 264 (FIG. 2) and accounting for the stiffness of the torque fingers 322 as detailed above.

FIG. 4A is a schematic, cross-sectional diagram of a bottom portion 301 of the planet carrier 300 coupled to the static structure 450, taken along the longitudinal axis 12 of the planet carrier 300, according to the present disclosure. The bottom portion 301 is a portion of the planet carrier 300 below the longitudinal axis 12 in the orientations shown in FIGS. 3A and 4A. FIG. 4A shows a pin 292 disposed in a respective planet gear pocket 306. The pin 292 of FIG. 4A is a first pin 292a. The planet gear associated with the first pin 292a is not illustrated in FIG. 4A for clarity. The first pin 292a extends through the pin apertures 308 (FIG. 3A) of the planet carrier 300 from the forward wall 310 to the aft wall 312. As shown in FIG. 4A, the planet carrier 300 is coupled to the static structure 450 at the coupling portion 316 by a plurality fastening mechanisms 452 inserted through the plurality of fastening openings 318 (FIG. 3A). The plurality of fastening mechanisms 452 are bolts in FIG. 4A, but the plurality of fastening mechanisms 452 can include any type of fastening mechanisms, such as, for example, screws, rivets, or the like. As detailed above, the coupling portion 316 is an annular flange and extends radially outward from the carrier body 302, for example, from the plurality of torque fingers 322.

Figure 4B:
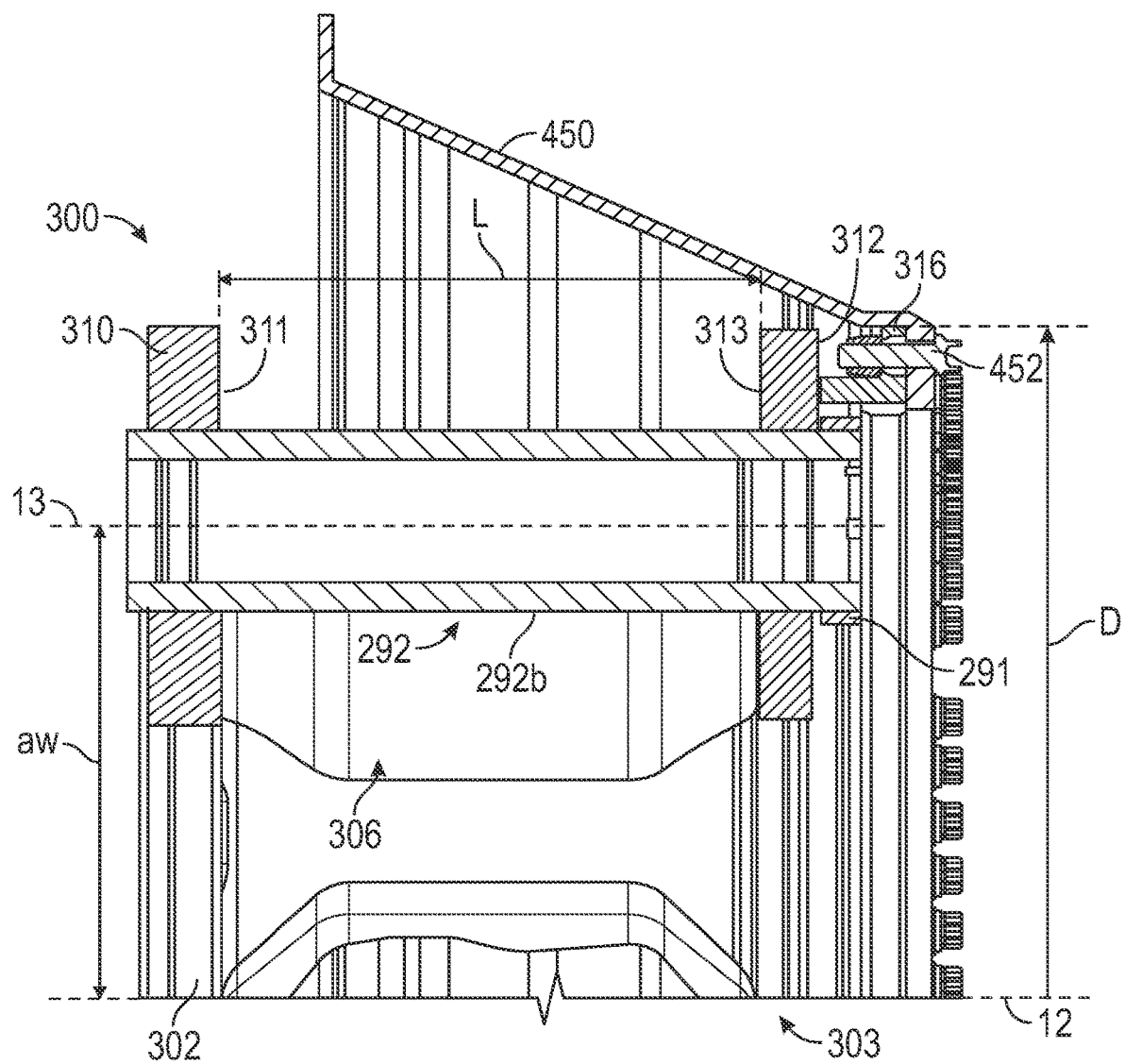
FIG. 4B is a schematic, cross-sectional diagram of the planet carrier of FIG. 3A coupled to the static structure of FIG. 4A, taken along the longitudinal axis of the planet carrier, and showing a top portion of the planet carrier above the longitudinal axis, according to the present disclosure.

FIG. 4A shows a midplane 305 of the planet carrier 300. The midplane 305 is an imaginary plane through the planet carrier 300 and is located at an axial center of the planet carrier 300. As shown in FIG. 4A, the plurality of ribs 324 (one rib 324 shown in FIG. 4A) extend from the plurality of torque fingers 322 (one torque finger 322 shown in FIG. 4A). The plurality of ribs 324 are disposed radially inward from the plurality of torque fingers 322. The torque finger 322 is connected to the rib 324 at a torque finger connection portion 325. The torque finger connection portion 325 is the portion at which the torque finger 322 is connected to the carrier body 302. An axial distance $X_{TF}$ of the torque finger 322 is defined from the midplane 305 to the torque finger connection portion 325. The axial distance $X_{TF}$ of the torque finger 322 is an offset between the midplane 305 and the torque finger connection portion 325. The axial distance $X_{TF}$ of the torque finger 322 is a function of the planet gear pocket length L (FIG. 4B). For example, the axial distance $X_{TF}$ is plus or minus twenty percent of the planet gear pocket length L (±0.2×L). Changing the axial distance $X_{TF}$ of the torque finger 322 changes the deflection location of the carrier body 302 at which the torque finger 322 absorbs the torque during operation. The axial distance $X_{TF}$ can be selected based on the desired stiffness of the torque finger 322 to absorb deflections from the first roller bearing 294a (FIG. 2) and from the second roller bearing 294b (FIG. 2) such that the delta magnitude of the deflection between the first roller bearing 294a and the second roller bearing 294b is zero (e.g., bearing races move in the same direction and by the same magnitude in the tangential direction under load). Increasing $X_{TF}$ (e.g., moving the center plate 320 of FIG. 3A axially aft) increases the magnitude of deflection of the first roller bearing 294a with respect to the second roller bearing 294b. Decreasing $X_{TF}$ (e.g., moving the center plate 320 axially forward) increases the magnitude of deflection of the second roller bearing 294b with respect to the first roller bearing 294a.

FIG. 4B is a schematic, cross-sectional diagram of a top portion 303 of the planet carrier 300 coupled to the static structure 450, taken along the longitudinal axis 12 of the planet carrier 300, according to the present disclosure. The top portion 303 is a portion of the planet carrier 300 above the longitudinal axis 12 in the orientations shown in FIGS. 3A and 4B. FIG. 4B shows a pin 292 disposed in a respective planet gear pocket 306. The pin 292 of FIG. 4B is a second pin 292b. The planet gear associated with the second pin 292b is not illustrated in FIG. 4B for clarity. The second pin 292b extends through the pin apertures 308 (FIG. 3A) of the planet carrier 300 from the forward wall 310 to the aft wall 312. The second pin 292b is secured within the planet carrier 300 by a nut 291, or the like. The nut 291 can be press fit onto the second pin 292b or can be coupled to the second pin 292b by a threaded connection. Each pin 292 of the planet carrier 300 includes a corresponding nut 291 for securing each pin 292 within the planet carrier 300.

The planet carrier 300 includes a planet carrier diameter D that is defined as an outer diameter of the planet carrier 300. FIG. 4B shows the planet carrier diameter D is measured at the coupling portion 316. The planet carrier diameter D, however, can be measured at any outer diameter of the planet carrier 300, such as, for example, at the forward wall 310 or at the aft wall 312. The planet carrier diameter D is selected such that there is clearance between the planet carrier 300 and the ring gear 266 (FIG. 2). The planet gear pocket 306 includes a planet gear pocket length L that is defined as an axial length of the planet gear pocket 306. The planet gear pocket length L is measured from an aft surface 311 of the forward wall 310 to a forward surface 313 of the aft wall 312. The planet gear pocket length L is selected to reduce an overall axial length of the planet carrier 300 while accommodating a respective planet gear 264 (FIG. 2). Each pin 292 is disposed in the planet carrier 300 at a pin center distance aw that is defined as a radial distance from the longitudinal axis 12 to the central axis 13 of the pin 292. The pin center distance aw is selected to reduce an overall size and weight of the planet carrier 300 (e.g., to reduce the planet carrier diameter D) while accommodating the plurality of planet gears 264 (FIG. 2).

Figure 5A:
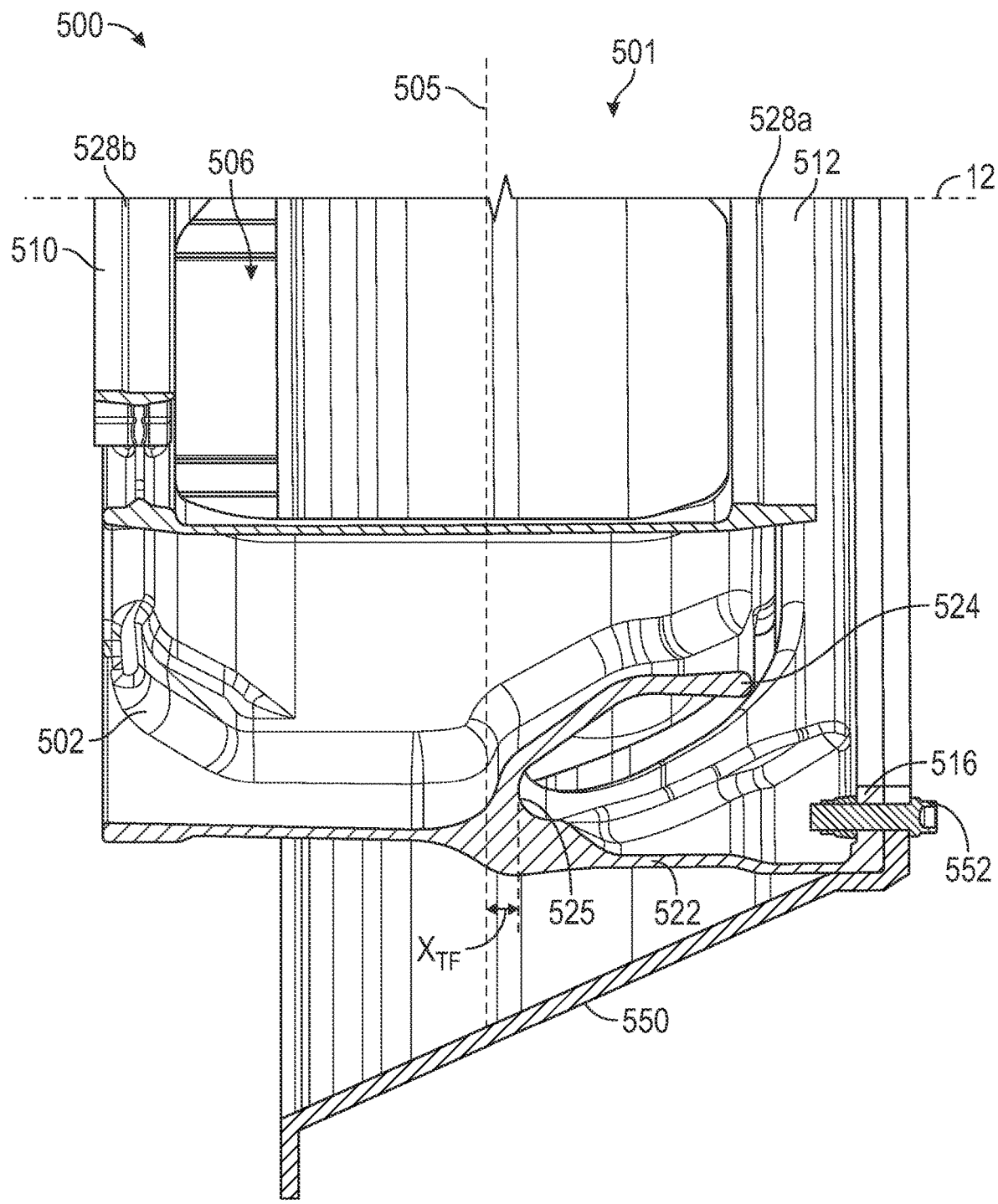
FIG. 5A is a schematic, cross-sectional diagram of a planet carrier coupled to a static structure, taken along the longitudinal axis of the planet carrier, and showing a bottom portion of the planet carrier below the longitudinal axis, according to another embodiment.

FIG. 5A is a schematic, cross-sectional diagram of a bottom portion 501 of a planet carrier 500 coupled to a static structure 550, taken along the longitudinal axis 12 of the planet carrier 500, according to another embodiment. The bottom portion 501 is a portion of the planet carrier 500 below the longitudinal axis 12. The pin and the planet gear associated with the pin are not illustrated in FIG. 5A for clarity. The planet carrier 500 is substantially similar to the planet carrier 300 of FIGS. 3A to 4B. For example, the planet carrier 500 includes a carrier body 502, a plurality of planet gear pockets 506, a forward wall 510, an aft wall 512, a coupling portion 516, a plurality of torque fingers 522 (only one shown in FIG. 5A), a plurality of ribs 524 (only one shown in FIG. 5A), a torque finger connection portion 525, a first cylindrical interface 528a, and a second cylindrical interface 528b. Although not shown in the view of FIG. 5A, the planet carrier 500 also includes a sun gear opening, a plurality of pin apertures, sidewalls, and center plates.

As shown in FIG. 5A, the planet carrier 500 is coupled to the static structure 550 at the coupling portion 516 by a plurality fastening mechanisms 552 inserted through a plurality of fastening openings. The coupling portion 516 of FIG. 5A is an annular flange and extends radially inward from the carrier body 502, for example, from the plurality of torque fingers 522. In this way, the coupling portion 516 is different than the coupling portion 316 of FIG. 3A to 4B. For example, the coupling portion 516 extends radially inward instead of radially outward. Such a configuration of the coupling portion 516 provides for a stiffer coupling to the static structure 550 as compared to the coupling portion 316 of FIGS. 3A to 4B. In this way, the plurality of torque fingers 522 are less thick than the plurality of torque fingers 322 (FIG. 4A) due to more stiffness being provided by the coupling portion 516 compared to the coupling portion 316 (FIG. 4A). In this way, the coupling portion 516 allows for the plurality of torque fingers 522 to have a reduced size, thereby reducing the overall weight of the planet carrier 500 while maintaining adequate absorption of the torque from the plurality of planet gears 264 (FIG. 2) during operation.

FIG. 5A shows a midplane 505 of the planet carrier 500. The plurality of ribs 524 extend from the plurality of torque fingers 522 and the plurality of torque fingers 522 are connected to the plurality of ribs 524 at a torque finger connection portion 525. The torque finger connection portion 525 is the portion at which a respective torque finger 522 is connected to the carrier body 502. The axial distance $X_{TF}$ of the torque finger 522 is between ±0.2×L, as detailed above. The axial distance $X_{TF}$ of the torque finger 522 is greater than the axial distance $X_{TF}$ of the torque finger 322 (FIG. 4A) due to a different stiffness balance between the planet carrier 300 (FIG. 4A) and the planet carrier 500.

Figure 5B:
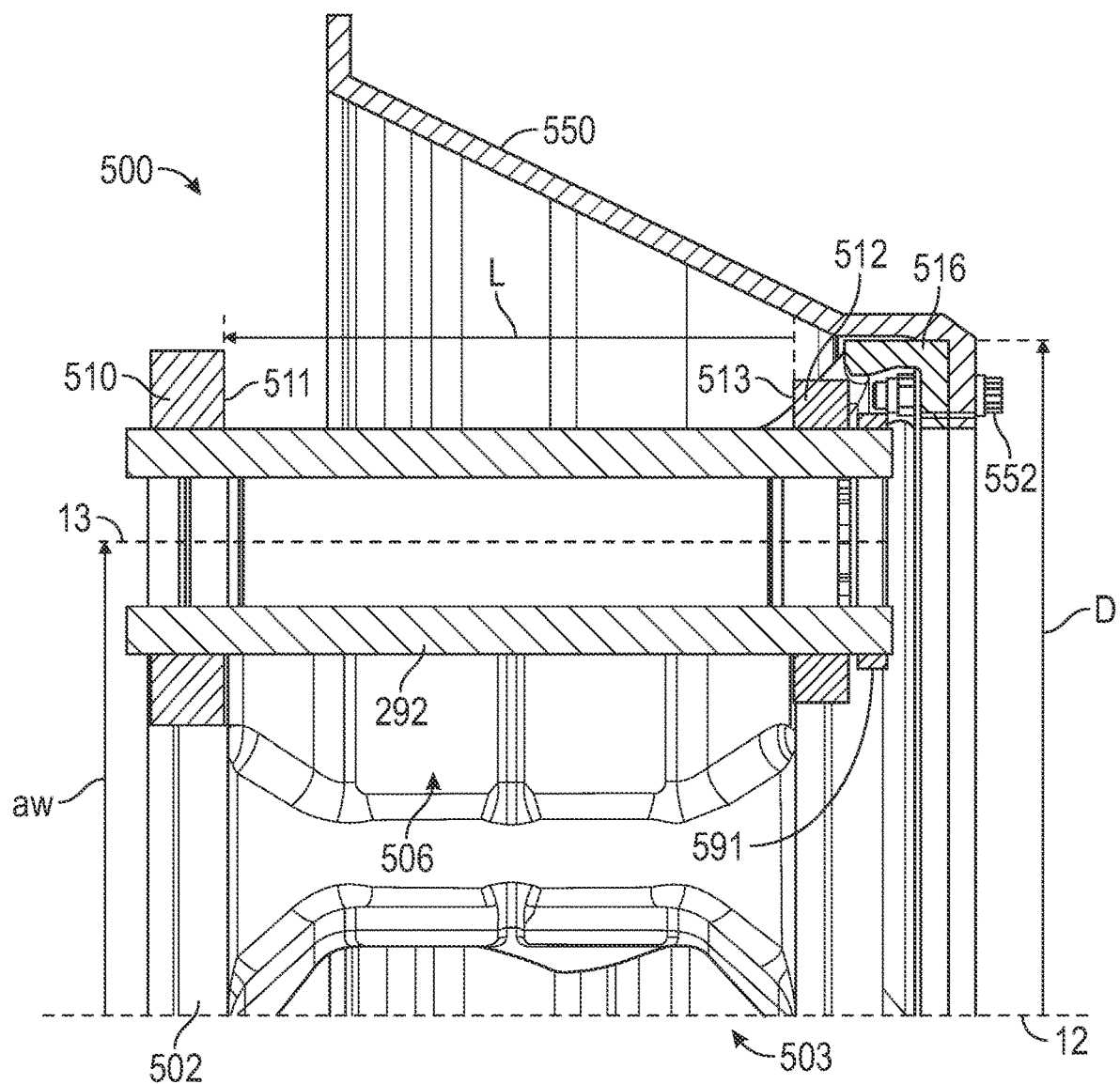
FIG. 5B is a schematic, cross-sectional diagram of the planet carrier of FIG. 5A coupled to the static structure of FIG. 5A, taken along the longitudinal axis of the planet carrier, and showing a top portion of the planet carrier above the longitudinal axis, according to the present disclosure.

FIG. 5B is a schematic, cross-sectional diagram of a top portion 503 of the planet carrier 500 coupled to the static structure 550, taken along the longitudinal axis 12 of the planet carrier 500, according to the present disclosure. The top portion 503 is a portion of the planet carrier 500 above the longitudinal axis 12. FIG. 5B shows a pin 292 disposed in a respective planet gear pocket 306. The planet gear associated with the pin 292 is not illustrated in FIG. 5B for clarity. The pin 292 extends through the pin apertures of the planet carrier 500 from the forward wall 510 to the aft wall 512. The pin 292 is secured within the planet carrier 500 by a nut 591, or the like, as detailed above.

The planet carrier 500 includes the planet carrier diameter D that is defined as an outer diameter of the planet carrier 500. FIG. 5B shows the planet carrier diameter D is measured at the coupling portion 516. The planet carrier diameter D, however, can be measured at any outer diameter of the planet carrier 500, such as, for example, at the forward wall 510 or at the aft wall 512. The planet carrier diameter D is selected such that there is clearance between the planet carrier 500 and the ring gear 266 (FIG. 2). The planet gear pocket 506 includes a planet gear pocket length L that is defined as an axial length of the planet gear pocket 506. The planet gear pocket length L is measured from an aft surface 511 of the forward wall 510 to a forward surface 513 of the aft wall 512. The planet gear pocket length L is selected to reduce an overall axial length of the planet carrier 500 while accommodating a respective planet gear 264 (FIG. 2). Each pin 292 is disposed in the planet carrier 500 at a pin center distance aw that is defined as a radial distance from the longitudinal axis 12 to the central axis 13 of the pin 292. The pin center distance aw is selected to reduce an overall size and weight of the planet carrier 500 (e.g., to reduce the planet carrier diameter D) while accommodating the plurality of planet gears 264 (FIG. 2).

As mentioned earlier, the inventors sought to improve upon the size and the weight of a power gearbox. With regard to the sizing and weight requirements, consideration was given not simply to those factors affecting the inertial and thermal loading environment such as the size of gears to carry a load, durability, heat dissipation, lubrication requirements, etc., but also the size of the bearings (e.g., the roller bearings 294) including a rolling element length $L_R$ over a rolling element diameter $D_R$ of the rolling elements 295 (FIG. 2), the total gear ratio of the gearbox assembly 55 (FIG. 2), the material of the bearings (e.g., ceramic, etc.), and a split of the first gear ratio of the first stage planet gear 270 (FIG. 2) and the second gear ratio of the second stage planet gear 272 (FIG. 2), which can limit the selection of the planet carrier 300 (FIG. 3A). In contrast to existing aircraft engines requiring a power gearbox (e.g., a gearbox that couples a low power shaft to the fan) that either utilizes a relatively low gear ratio or a lower power rating requirement on the gearbox, embodiments considered (high power rating and gear ratio) presented challenges in determining how the planet carrier 300 (FIG. 3A), and, therefore, the gearbox assembly 55 (FIG. 2), could be reduced in size and weight while still being capable of transferring torque with high efficiency, and to account for reliability and manufacturability of the planet carrier 300 for a particular sizing of the bearings, the total gear ratio, and the split of the first gear ratio and the second gear ratio of the planet gears 264 in a reliable, repeatable manner.

Selecting a size of the planet carrier 300 (FIG. 3A) taking into consideration the ability to absorb torque (e.g., via the plurality of torque fingers) to maintain reliability and manufacturability of the planet carrier while also accounting for the sizing of the bearings, the total gear ratio, and the split of the first gear ratio and the second gear ratio is challenging, and the impact of different types of improvements and configurations of the planet carrier is not easily predictable without empirical experimentation and simulation. Modifications to the size of various components of the planet carrier 300, such as, for example, the diameter and the length of the plurality of planet gear pockets 306 (FIGS. 3A to 4B), the diameter of the planet carrier 300 (FIGS. 3A to 4B), and the distance of the pins 292 (FIGS. 4A and 4B) from the longitudinal axis of the planet carrier 300 affect the ability of the planet carrier 300 to accommodate and effectively absorb torque from the planet gears 264 (FIG. 2) based upon the factors detailed above, thereby affecting the reliability and the manufacturability of the planet carrier 300. While reference is made to the planet carrier 300, embodiments of the present disclosure are applicable to any of the planet carriers detailed herein.

During the course of the evaluation of different embodiments as set forth herein with the goal of improving upon the size (e.g., the axial length or radial height) and the weight of a gearbox, the inventors discovered, unexpectedly, that there exists a relationship among the planet gear pocket diameter $D_p$, the planet gear pocket length L, the planet carrier diameter D, and the pin center distance aw, which uniquely identify a finite and a readily ascertainable (in view of this disclosure) number of embodiments suitable for a particular architecture that accounts for the size of the bearings (e.g., the roller bearings 294), the total gear ratio, and the gear ratio split of the first gear ratio and the second gear ratio that affect the ability of the planet carrier 300 to adequately absorb the torque from the planet gears 264. The discovery enables one to select a size of the planet carrier 300, thereby reducing the size and the weight of the gearbox assembly 55, and, thus, the size and the weight of the turbine engine 10, while accounting for the torques on the planet carrier 300 from the planet gears 264 based on the factors above. This relationship is referred to as a planet carrier envelope, in relationship (1):

$$\text{planet carrier envelope} = \left(\frac{D_p}{L}\right) * \left(\frac{D}{aw}\right)$$

$D_p/L$ is referred to as a planet gear pocket aspect ratio, and includes the planet gear pocket diameter $D_p$ divided by the planet gear pocket length L. D/aw is referred to as a planet carrier radial ratio, and includes the planet carrier diameter D divided by the pin center distance aw. Accordingly, the planet carrier envelope is the planet gear pocket aspect ratio multiplied by the planet carrier radial ratio.

As discussed further below, the inventors have identified a range of the planet carrier envelope that enables a planet carrier 300 to be designed for a wide range of engine designs such that the planet carrier 300 adequately accounts for the torque from the planet gears 264 while reducing the size and the weight of the gearbox assembly 55, and, thus, reducing the size and the weight of the turbine engine 10, as compared to gearbox assemblies and turbine engines without the benefit of the present disclosure.

Using this unique relationship, the size of the planet carrier 300 can be selected for a more compact gearbox assembly 55 that reduces engine size and weight. Additionally, using the planet carrier envelope as a guide, the planet carrier 300 can be developed, while considering the torque from the planet gears 264 based on the size of the bearings, the total gear ratio, and the split of the first gear ratio and the second gear ratio, thereby reducing a size of the gearbox assembly 55 and of the turbine engine 10. Thus, the planet carrier envelope detailed herein results in a reduced size and a reduced weight of a gearbox assembly and of a turbine engine and, thus, an improved efficiency of the gearbox assembly 55 and improved turbine engine efficiency (e.g., improved efficiency in the conversion of kinetic energy in the fluid stream to mechanical energy in the turbine shaft).

The inventors also desire to arrive at design possibilities at an early stage of design, so that the downstream selection of candidate improved designs, given the tradeoffs, become more predictable. Heretofore, the process has sometimes been more ad hoc, selecting one design or another without knowing the impact when a concept is first taken into consideration. For example, and referring to FIG. 1, various aspects of the primary fan 52 design, the combustion section design, the compressor section design, the turbine section design, etc., may not be known, but such components impact the total gear ratio, the size of the bearings, and, therefore, the torque on the planet carrier, thereby affecting the size of the planet carrier and, thus, may influence the design of the planet carrier.

The planet carrier envelope relationship is preferably used for multi-stage gearboxes for turbine engines that have relatively high-power ratings (e.g., greater than 7 megawatts, greater than 15 megawatts, or greater than 22 megawatts) and gear ratios of six to one (6:1) and twelve to one (12:1). For example, the relationship detailed herein is preferably used in unducted single fan engines with a high-speed, low pressure turbine and variable pitch propellers, and gearbox assemblies with two stage compound symmetrical planet gears. The planet carrier envelope relationship, however, can be used for turbine engines with a power rating lower than the high-power ratings discussed above.

Table 1 represents exemplary embodiments 1 to 17 identifying the planet carrier envelope for various engines with various total gear ratios and output torques. Embodiments 1 to 17 may represent the turbine engine 10 described with respect to FIG. 1 and can be applied to any of the planet carriers detailed herein (e.g., the planet carrier 300 and/or the planet carrier 500). In Table 1, the planet carrier envelope is determined based on the relationship (1) described above.

TABLE 1

| Emb. | Total Gear Ratio, GR | D (mm) | aw (mm) | $D_p$ (mm) | L (mm) | Dp/L | D/aw | $(D_p/L)*$ (D/aw) |
|---|---|---|---|---|---|---|---|---|
| 1 | 8.57 | 647 | 224.5 | 342 | 263 | 1.3 | 2.88 | 3.7 |
| 2 | 6.66 | 454 | 160 | 226 | 199 | 1.1 | 2.84 | 3.2 |
| 3 | 7.65 | 456 | 160 | 236.5 | 199 | 1.2 | 2.85 | 3.4 |
| 4 | 7.61 | 447 | 160 | 233 | 197 | 1.2 | 2.79 | 3.3 |
| 5 | 9.82 | 677 | 239 | 373 | 263 | 1.4 | 2.83 | 4.0 |
| 6 | 8.12 | 648 | 224 | 338.5 | 282 | 1.2 | 2.89 | 3.5 |
| 7 | 8.19 | 611 | 211 | 320 | 286 | 1.1 | 2.9 | 3.2 |
| 8 | 8.83 | 674 | 235.5 | 360.5 | 263 | 1.4 | 2.86 | 3.9 |
| 9 | 8.12 | 622 | 215 | 325 | 283 | 1.1 | 2.89 | 3.3 |
| 10 | 9.29 | 643 | 227 | 350.5 | 261 | 1.3 | 2.83 | 3.8 |
| 11 | 8.31 | 624 | 218 | 329.5 | 281 | 1.2 | 2.86 | 3.4 |
| 12 | 8.46 | 636 | 223 | 338 | 264 | 1.3 | 2.85 | 3.7 |
| 13 | 8.4 | 641 | 224 | 339 | 268 | 1.3 | 2.86 | 3.6 |
| 14 | 7.62 | 1087 | 375 | 552 | 413 | 1.3 | 2.9 | 3.9 |
| 15 | 7.62 | 1058 | 365 | 538 | 405 | 1.3 | 2.9 | 3.9 |
| 16 | 9.57 | 639 | 225 | 350 | 257 | 1.4 | 2.84 | 3.9 |
| 17 | 8.09 | 641 | 226 | 335 | 239 | 1.4 | 2.84 | 4.0 |
| 18 | 8.60 | 714 | 239 | 370 | 269 | 1.38 | 2.99 | 4.1 |
| 19 | 8.57 | 617 | 219 | 331 | 263 | 1.26 | 2.82 | 3.5 |
| 20 | 8.64 | 669 | 237 | 358 | 277 | 1.29 | 2.82 | 3.6 |
| 21 | 8.04 | 639 | 229 | 338 | 285 | 1.19 | 2.79 | 3.3 |

The total gear ratio is in a range of 6:1 and 12:1 as detailed above. The planet carrier diameter D is in a range of four hundred forty-seven millimeters (447 mm) and one thousand eighty-seven millimeters (1087 mm). In general, the planet carrier diameter D increases as the output torque of the gearbox assembly increases, and the planet carrier diameter D decreases as the output torque of the gearbox assembly decreases. The pin center distance aw is in a range of one hundred sixty millimeters (160 mm) and three hundred seventy-five millimeters (375 mm). In general, the pin center distance aw increases as the output torque of the gearbox assembly increases, and the pin center distance aw decreases as the output torque of the gearbox assembly decreases. The planet gear pocket diameter $D_p$ is in a range of two hundred twenty-six millimeters (226 mm) and five hundred fifty-two millimeters (552 mm). In general, the planet gear pocket diameter $D_p$ increases as the gear ratio and/or the output torque of the gearbox assembly increases, and the planet gear pocket diameter $D_p$ decreases as the gear ratio and/or the output torque of the gearbox assembly decreases. The planet gear pocket length L is in a range of one hundred ninety-seven millimeters (197 mm) and four hundred thirteen millimeters (413 mm).

Figure 6:
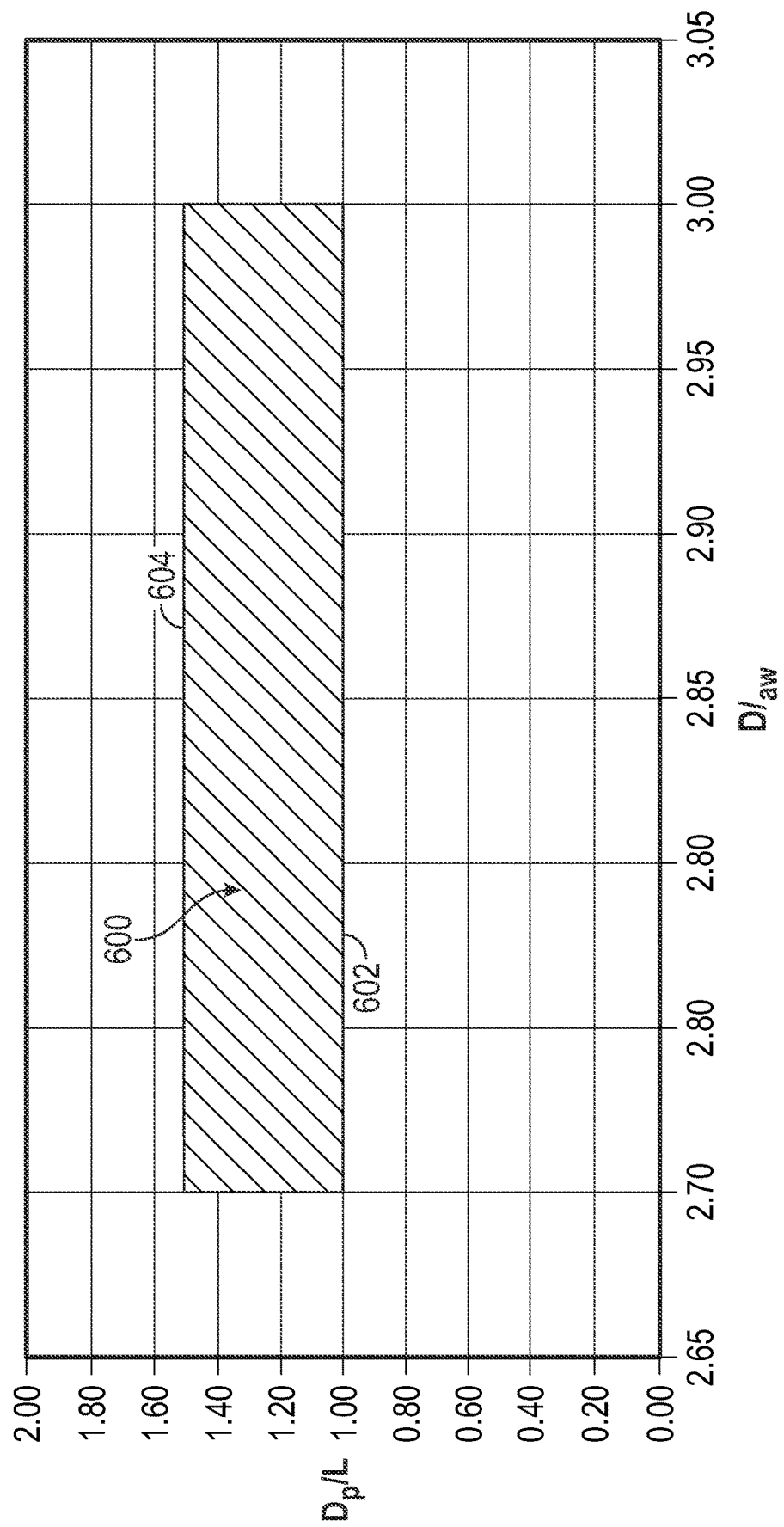
FIG. 6 is a graph illustrating a planet gear pocket aspect ratio ($D_p/L$) as a function of a planet carrier radial ratio (D/aw), according to the present disclosure.

FIG. 6 represents, in graph form, the planet gear pocket aspect ratio ($D_p/L$) as a function of the planet carrier radial ratio (D/aw). An area 600 represents the boundaries of the planet carrier envelope (e.g., the planet gear pocket aspect ratio multiplied by the planet carrier radial ratio). For example, the area 600 extends between a lower boundary 602 and an upper boundary 604. The planet gear pocket aspect ratio is in a range of one (1.00) and one point five (1.50). The planet carrier radial ratio is in a range of two point seven (2.70) and three (3.00). Table 1 and FIG. 6 show that the planet carrier envelope changes based on the planet gear pocket aspect ratio and the planet carrier radial ratio. For example, the planet carrier envelope increases as the planet gear pocket aspect ratio and/or the planet carrier radial ratio increases. The planet carrier envelope is at a minimum when the planet gear pocket aspect ratio is one (1.00) and the planet carrier radial ratio is two point seven (2.70). The planet carrier envelope increases as the planet gear pocket aspect ratio and the planet carrier radial ratio increase and the planet carrier envelope is at a maximum when the planet gear pocket aspect ratio is one point five (1.50) and the planet carrier radial ratio is three (3.00).

Accordingly, the planet carrier envelope is in a range of two point seven (2.70) and four point five (4.50). The planet carrier envelope approaches four point five (4.50) for higher total gear ratios (e.g., gear ratios closer to 12:1), for lower $L_R/D_R$ ratios (e.g., less than 1.5) of the bearings, and/or for bearing elements made of material for targeting higher stresses before deformation or failure (e.g., ceramic or the like). The planet carrier envelope approaches two point seven (2.70) for lower total gear ratios (e.g., gear ratios closer to 6:1), for higher $L_R/D_R$ ratios (e.g., greater than 1.5) of the bearings, and/or for bearing elements made of material for targeting lower stresses before deformation or failure (e.g., steel or the like). The range of the planet carrier envelope ensures that the planet carrier 300 can adequately absorb the torque from the planet gears 264 to reduce stress and vibrations on the planet carrier 300, while reducing the size and the weight of the planet carrier 300, and, therefore, reducing the size and the weight of the gearbox assembly 55 and the turbine engine 10 (FIG. 1), as compared to planet carriers and engines without the benefit of the present disclosure.

Figure 7:
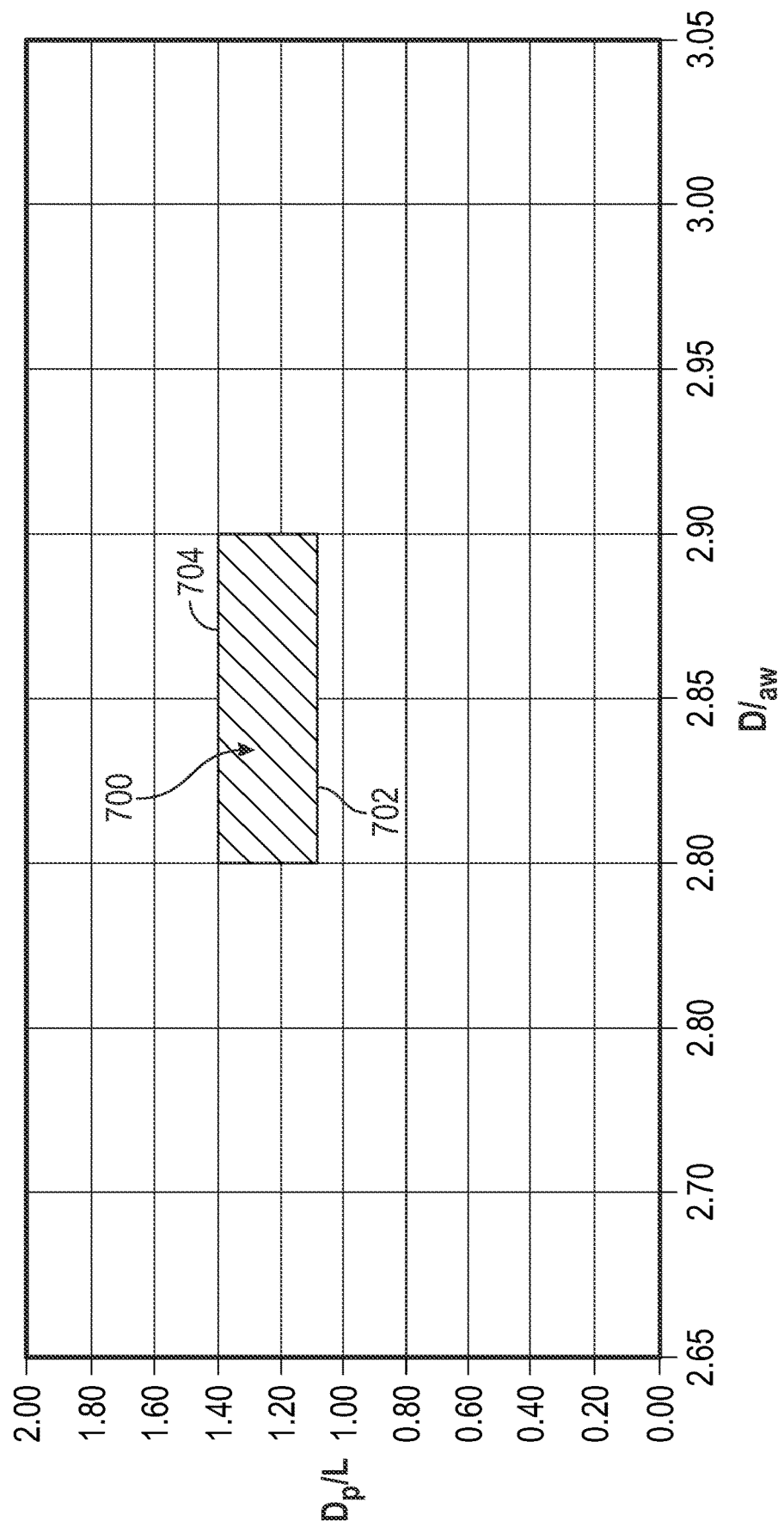
FIG. 7 is a graph illustrating a planet gear pocket aspect ratio ($D_p/L$) as a function of a planet carrier radial ratio (D/aw), according to another embodiment.

FIG. 7 represents, in graph form, the planet gear pocket aspect ratio ($D_p/L$) as a function of the planet carrier radial ratio (D/aw), according to another embodiment. An area 700 represents the boundaries of the planet carrier envelope (e.g., the planet gear pocket aspect ratio multiplied by the planet carrier radial ratio). For example, the area 700 extends between a lower boundary 702 and an upper boundary 704. The planet gear pocket aspect ratio is in a range of one point one (1.10) and one point four (1.40). The planet carrier radial ratio is in a range of two point eight (2.80) and two point nine (2.90). The planet carrier envelope is a minimum when the planet gear pocket aspect ratio is one point one (1.10) and the planet carrier radial ratio is two point eight (2.80). The planet carrier envelope increases as the planet gear pocket aspect ratio and the planet carrier radial ratio increase and the planet carrier envelope is a maximum when the planet gear pocket aspect ratio is one point four (1.40) and the planet carrier radial ratio is two point nine (2.90). Accordingly, the planet carrier envelope is in a range of three point zero eight (3.08) and four point zero six (4.06). The range of the planet carrier envelope in FIG. 7 is selected for bearing sizes having $L_r/D_r$ greater than one point five (1.5), and for gear proportions between the first stage planet gear 270 (FIG. 2) and the second stage planet gear 272 (FIG. 2) that can accommodate a grinding wheel for manufacturability. The range of the planet carrier envelope of FIG. 6 is selected for gearbox assemblies with total gear ratios closer to the lower end of the range (e.g., 6:1) or closer to the higher end of the range (e.g., 12:1), and for bearing sizes having $L_r/D_r$ less than one point five (1.5).

The embodiments of the present disclosure detailed herein may be used for an unducted single fan (USF) engine architecture with a high-speed low-pressure turbine and a variable pitch propeller or fan. Such engines provide for a high power rating In such high power engines, however, a high gear ratio is needed to drive the propeller at the required speed and torque. For example, the gear ratio of the power gearbox between the low pressure turbine and the propeller can be in a range of 6:1 and 12:1. Further, the compound planet gears can reduce the speed from the low pressure turbine to the propeller to the required level and provide advantageous engine integration. The embodiments of the present disclosure, however, can be applied to engines with lower power ratings. The embodiments of the present disclosure provide for a planet carrier sized to adequately absorb the torque from the planet gears described above while accommodating the geometrical constrains of the planet gears of the power gearbox. Accordingly, the relationship detailed herein allows for planet carriers that are sized to account for the torque from the planet gears, while also reducing the size and weight of the gearbox assembly and the overall size, weight, and efficiency of the turbine engine.

Further aspects are provided by the subject matter of the following clauses.

A gearbox assembly comprises a plurality of planet gears, and a planet carrier including a plurality of planet gear pockets, each of the plurality of planet gears mounted in a respective planet gear pocket about a pin, and the planet carrier characterized by a planet carrier envelope in a range of 2.70 and 4.50, the planet carrier envelope equal to a product of a planet gear pocket aspect ratio multiplied by a planet carrier radial ratio, the planet gear pocket aspect ratio being given by $D_p/L$, and the planet carrier radial ratio is given by D/aw, $D_p$ being a planet gear pocket diameter of the plurality of planet gear pockets in a circumferential direction, L is a planet gear pocket length of the plurality of planet gear pockets in an axial direction, D is a planet carrier diameter of the planet carrier in a radial direction, and aw is a pin center distance from a longitudinal axis of the planet carrier to an axis of the pin.

The gearbox assembly of the preceding clause, the planet carrier envelope being in a range of 3.08 and 4.06.

The gearbox assembly of any preceding clause, the planet gear pocket aspect ratio being in a range of 1.00 and 1.50.

The gearbox assembly of any preceding clause, the planet gear pocket aspect ratio being in a range of 1.10 and 1.40.

The gearbox assembly of any preceding clause, the planet carrier radial ratio being in a range of 2.70 and 3.00.

The gearbox assembly of any preceding clause, the planet carrier radial ratio being in a range of 2.80 and 2.90.

The gearbox assembly of any preceding clause, the gearbox assembly having a gear ratio in a range of 6:1 and 12:1.

The gearbox assembly of any preceding clause, the plurality of planet gear pockets including a generally octagonal shape.

The gearbox assembly of any preceding clause, the generally octagonal shape of the plurality of planet gear pockets including a planet gear pocket angle α in a range of 100° and 170°.

The gearbox assembly of any preceding clause, the planet carrier including a plurality of torque fingers that absorb torque through the planet carrier.

The gearbox assembly of any preceding clause, the planet carrier including a plurality of torque fingers and a plurality of ribs, the plurality of torque fingers connected to a plurality of ribs at a torque finger connection portion.

The gearbox assembly of any preceding clause, the torque finger connection portion at an axial distance $X_{TF}$ from a midplane of the planet carrier, the axial distance $X_{TF}$±20% of the planet gear pocket length L.

The gearbox assembly of any preceding clause, each of the plurality of torque fingers including a generally trapezoidal shape including a first base and a second base connected by a pair of legs.

The gearbox assembly of any preceding clause, the pair of legs extending from the first base at a torque finger angle β, the torque finger angle β in a range of 30° and 80°.

The gearbox assembly of any preceding clause, planet gear pocket diameter $D_p$ in a range of 226 mm and 552 mm.

The gearbox assembly of any preceding clause, the planet gear pocket length L in a range of 197 mm and 413 mm.

The gearbox assembly of any preceding clause, the planet carrier diameter D in a range of 447 mm and 1087 mm.

The gearbox assembly of any preceding clause, the pin center distance aw in a range of 160 mm and 375 mm.

The gearbox assembly of any preceding clause, the planet carrier including a carrier body having a forward wall, an aft wall, and sidewalls that connect the forward wall and the aft wall.

The gearbox assembly of any preceding clause, each of the plurality of planet gear pockets defined by the forward wall, the aft wall, and a pair of the sidewalls.

The gearbox assembly of any preceding clause, the planet gear pocket length L defined from the forward wall to the aft wall.

The gearbox assembly of any preceding clause, the planet gear pocket diameter $D_p$ defined between the pair of sidewalls.

The gearbox assembly of any preceding clause, the carrier body including a plurality of center plates, each of the plurality of center plates connecting a pair of the plurality of planet gear pockets.

The gearbox assembly of any preceding clause, the plurality of center plates located axially approximately halfway between the forward wall and the aft wall.

The gearbox assembly of any preceding clause, the plurality of planet gear pockets including a generally octagonal shape.

The gearbox assembly of any preceding clause, the generally octagonal shape of the plurality of planet gear pockets including a pair of axially-extending sides, a pair of circumferentially-extending sides, and four angled sides that extend at a planet gear pocket angle α between the axially-extending sides and the circumferentially-extending sides.

The gearbox assembly of any preceding clause, the planet carrier including a coupling portion.

The gearbox assembly of any preceding clause, the gearbox assembly further comprising a ring gear, the coupling portion having a diameter less than a diameter of the ring gear.

The gearbox assembly of any preceding clause, the coupling portion extending radially outward from the planet carrier.

The gearbox assembly of any preceding clause, the coupling portion extending radially inward from planet carrier.

The gearbox assembly of any preceding clause, the coupling portion coupled to a static structure of a turbine engine.

The gearbox assembly of any preceding clause, the planet carrier further including a plurality of torque fingers that connect to the plurality of planet gear pockets and to the coupling portion.

The gearbox assembly of any preceding clause, the planet carrier further including a plurality of ribs that extend between the plurality of planet gear pockets, the plurality of ribs limiting deflection of the aft wall circumferentially.

The gearbox assembly of any preceding clause, the plurality of ribs disposed radially inward from the plurality of torque fingers.

The gearbox assembly of any preceding clause, each of the plurality of torque fingers including a generally trapezoidal shape including a first base and a second base connected by a pair of legs, the first base formed integrally with the coupling portion.

The gearbox assembly of any preceding clause, the planet carrier including a plurality of pin apertures, the pin disposed in the plurality of pin apertures.

The gearbox assembly of any preceding clause, the pin press fit within the plurality of pin apertures.

The gearbox assembly of any preceding clause, the pin secured to the planet carrier by a nut.

The gearbox assembly of any preceding clause, the nut positioned at the aft wall.

The gearbox assembly of any preceding clause, the planet carrier including a sun gear opening that defines an inner diameter of the planet carrier.

The gearbox assembly of any preceding clause, the planet carrier including a plurality cylindrical interfaces disposed about the sun gear opening.

The gearbox assembly of any preceding clause, the cylindrical interfaces receiving lubricant therein for distributing the lubricant to various components of the gearbox assembly.

The gearbox assembly of any preceding clause, the plurality of cylindrical interfaces disposed radially inward of the plurality of ribs.

The gearbox assembly of any preceding clause, the plurality of cylindrical interfaces located at the forward wall and the aft wall.

The gearbox assembly of any preceding clause, the plurality of planet gears being compound planet gears including a first stage planet gear and a second stage planet gear.

The gearbox assembly of any preceding clause, further comprising a sun gear and a ring gear, the plurality of planet gears meshing with the sun gear and with the ring gear.

The gearbox assembly of any preceding clause, the planet carrier held stationary and the ring gear rotates about the longitudinal axis in a star type configuration.

The gearbox assembly of any preceding clause, the planet carrier rotating about the longitudinal axis in a planetary configuration.

The gearbox assembly of any preceding clause, further comprising one or more roller bearings disposed between the pin and each of the plurality of planet gears, the one or more roller bearings allowing rotation of each of the plurality of planet gears with respect to the pin.

The gearbox assembly of any preceding clause, a power rating of the engine being greater than 7 megawatts, greater than 15 megawatts, or greater than 22 megawatts.

The gearbox assembly of any preceding clause, the engine being an unducted single fan engine.

A turbine engine comprises a low pressure turbine having a low pressure shaft, a primary fan having a fan shaft, and a gearbox assembly coupled to the low pressure shaft and the fan shaft and transferring torque from the low pressure shaft to the fan shaft, the gearbox assembly comprising a plurality of planet gears, and a planet carrier including a plurality of planet gear pockets, each of the plurality of planet gears mounted in a respective planet gear pocket about a pin, and the planet carrier characterized by a planet carrier envelope in a range of 2.70 and 4.50, the planet carrier envelope equal to a product of a planet gear pocket aspect ratio multiplied by a planet carrier radial ratio, the planet gear pocket aspect ratio given by $D_p/L$, and the planet carrier radial ratio is given by D/aw, $D_p$ being a planet gear pocket diameter of the plurality of planet gear pockets in a circumferential direction, L is a planet gear pocket length of the plurality of planet gear pockets in an axial direction, D is a planet carrier diameter of the planet carrier in a radial direction, and aw is a pin center distance from a longitudinal axis of the planet carrier to a central axis of the pin.

The turbine engine of the preceding clause, the planet carrier envelope being in a range of 3.06 and 4.08.

The turbine engine of any preceding clause, the planet gear pocket aspect ratio being in a range of 1.00 and 1.50.

The turbine engine of any preceding clause, the planet gear pocket aspect ratio being in a range of 1.10 and 1.40.

The turbine engine of any preceding clause, the planet carrier radial ratio being in a range of 2.70 and 3.00.

The turbine engine of any preceding clause, the planet carrier radial ratio being in a range of 2.80 and 2.90.

The turbine engine of any preceding clause, the planet gear pocket diameter $D_p$ being in a range of 226 mm and 552 mm.

The turbine engine of any preceding clause, the planet gear pocket length L being in a range of 197 mm and 413 mm.

The turbine engine of any preceding clause, the planet carrier diameter D being in a range of 447 mm and 1087 mm.

The turbine engine of any preceding clause, the pin center distance aw being in a range of 160 mm and 375 mm.

The turbine engine of any preceding clause, the planet carrier including a carrier body having a forward wall, an aft wall, and sidewalls that connect the forward wall and the aft wall.

The turbine engine of any preceding clause, each of the plurality of planet gear pockets defined by the forward wall, the aft wall, and a pair of the sidewalls.

The turbine engine of any preceding clause, the planet gear pocket length L defined from the forward wall to the aft wall.

The turbine engine of any preceding clause, the planet gear pocket diameter $D_p$ defined between the pair of sidewalls.

The turbine engine of any preceding clause, the carrier body including a plurality of center plates, each of the plurality of center plates connecting a pair of the plurality of planet gear pockets.

The turbine engine of any preceding clause, the plurality of center plates located axially approximately halfway between the forward wall and the aft wall.

The turbine engine of any preceding clause, the plurality of planet gear pockets including a generally octagonal shape.

The turbine engine of any preceding clause, the generally octagonal shape of the plurality of planet gear pockets including a pair of axially-extending sides, a pair of circumferentially-extending sides, and four angled sides that extend at a planet gear pocket angle α between the axially-extending sides and the circumferentially-extending sides.

The turbine engine of any preceding clause, the planet gear pocket angle α being in a range of 100° and 170°.

The turbine engine of any preceding clause, the planet carrier including a coupling portion.

The turbine engine of any preceding clause, the gearbox assembly further comprising a ring gear, the coupling portion having a diameter less than a diameter of the ring gear.

The turbine engine of any preceding clause, the coupling portion extending radially outward from the planet carrier.

The turbine engine of any preceding clause, the coupling portion extending radially inward from planet carrier.

The turbine engine of any preceding clause, the coupling portion coupled to a static structure of the turbine engine.

The turbine engine of any preceding clause, the planet carrier further including a plurality of torque fingers that connect to the plurality of planet gear pockets and to the coupling portion.

The turbine engine of any preceding clause, the planet carrier further including a plurality of ribs that extend between the plurality of planet gear pockets, the plurality of ribs limiting deflection of the aft wall circumferentially.

The turbine engine of any preceding clause, the plurality of ribs disposed radially inward from the plurality of torque fingers.

The turbine engine of any preceding clause, the plurality of torque fingers connected to the plurality of ribs at a torque finger connection portion.

The turbine engine of any preceding clause, the torque finger connection portion at an axial distance $X_{TF}$ from a midplane of the planet carrier, the axial distance $X_{TF} \pm 0.2 \times L$.

The turbine engine of any preceding clause, each of the plurality of torque fingers including a generally trapezoidal shape including a first base and a second base connected by a pair of legs, the first base formed integrally with the coupling portion.

The turbine engine of any preceding clause, the pair of legs extending from the first base at a torque finger angle β, the torque finger angle β in a range of 30° and 80°.

The turbine engine of any preceding clause, the planet carrier including a plurality of pin apertures, the pin disposed in the plurality of pin apertures.

The turbine engine of any preceding clause, the pin press fit within the plurality of pin apertures.

The turbine engine of any preceding clause, the pin secured to the planet carrier by a nut.

The turbine engine of any preceding clause, the nut positioned at the aft wall.

The turbine engine of any preceding clause, the planet carrier including a sun gear opening that defines an inner diameter of the planet carrier.

The turbine engine of any preceding clause, the planet carrier including a plurality cylindrical interfaces disposed about the sun gear opening.

The turbine engine of any preceding clause, the cylindrical interfaces receiving lubricant therein for distributing the lubricant to various components of the gearbox assembly.

The turbine engine of any preceding clause, the plurality of cylindrical interfaces disposed radially inward of the plurality of ribs.

The turbine engine of any preceding clause, the plurality of cylindrical interfaces located at the forward wall and the aft wall.

The turbine engine of any preceding clause, the plurality of planet gears being compound planet gears including a first stage planet gear and a second stage planet gear.

The turbine engine of any preceding clause, further comprising a sun gear and a ring gear, the plurality of planet gears meshing with the sun gear and with the ring gear.

The turbine engine of any preceding clause, the planet carrier being held stationary and the ring gear rotates about the longitudinal axis in a star type configuration.

The turbine engine of any preceding clause, the planet carrier rotating about the longitudinal axis in a planetary configuration.

The turbine engine of any preceding clause, further comprising one or more roller bearings disposed between the pin and each of the plurality of planet gears, the one or more roller bearings allowing rotation of each of the plurality of planet gears with respect to the pin.

The turbine engine of any preceding clause, further comprising a gear ratio in a range of 6:1 and 12:1.

The turbine engine of any preceding clause, a power rating of the engine being greater than 7 megawatts, greater than 15 megawatts, or greater than 22 megawatts.

The turbine engine of any preceding clause, the engine being an unducted single fan engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
    a plurality of planet gears; and
    a planet carrier including a plurality of planet gear pockets, each of the plurality of planet gears mounted in a respective planet gear pocket about a pin, and the planet carrier characterized by a planet carrier envelope in a range of 2.70 and 4.50, the planet carrier envelope equal to a product of a planet gear pocket aspect ratio multiplied by a planet carrier radial ratio,
    wherein the planet gear pocket aspect ratio is given by $D_p/L$, and the planet carrier radial ratio is given by $D/aw$, wherein $D_p$ is a planet gear pocket diameter of the plurality of planet gear pockets in a circumferential direction, L is a planet gear pocket length of the plurality of planet gear pockets in an axial direction, D is a planet carrier diameter of the planet carrier in a radial direction, and aw is a pin center distance from a longitudinal axis of the planet carrier to an axis of the pin.

2. The gearbox assembly of claim 1, wherein the planet carrier envelope is in a range of 3.08 and 4.06.

3. The gearbox assembly of claim 1, wherein the planet gear pocket aspect ratio is in a range of 1.00 and 1.50.

4. The gearbox assembly of claim 1, wherein the planet gear pocket aspect ratio is in a range of 1.10 and 1.40.

5. The gearbox assembly of claim 1, wherein the planet carrier radial ratio is in a range of 2.70 and 3.00.

6. The gearbox assembly of claim 1, wherein the planet carrier radial ratio is in a range of 2.80 and 2.90.

7. The gearbox assembly of claim 1, wherein the gearbox assembly has a gear ratio in a range of 6:1 and 12:1.

8. The gearbox assembly of claim 1, wherein the plurality of planet gear pockets includes a generally octagonal shape.

9. The gearbox assembly of claim 8, wherein the generally octagonal shape of the plurality of planet gear pockets includes a planet gear pocket angle α in a range of 100° and 170°.

10. The gearbox assembly of claim 1, wherein the planet carrier includes a plurality of torque fingers that absorb torque through the planet carrier.

11. The gearbox assembly of claim 10, wherein the planet carrier includes a plurality of torque fingers and a plurality of ribs, the plurality of torque fingers connected to a plurality of ribs at a torque finger connection portion.

12. The gearbox assembly of claim 11, wherein the torque finger connection portion is at an axial distance $X_{TF}$ from a midplane of the planet carrier, the axial distance $X_{TF}$±20% of the planet gear pocket length L.

13. The gearbox assembly of claim 10, wherein each of the plurality of torque fingers includes a generally trapezoidal shape including a first base and a second base connected by a pair of legs.

14. The gearbox assembly of claim 13, wherein the pair of legs extends from the first base at a torque finger angle β, the torque finger angle β in a range of 30° and 80°.

15. A turbine engine comprising:
    a low pressure turbine having a low pressure shaft;
    a primary fan having a fan shaft; and
    a gearbox assembly coupled to the low pressure shaft and the fan shaft and transferring torque from the low pressure shaft to the fan shaft, the gearbox assembly comprising:
        a plurality of planet gears; and
        a planet carrier including a plurality of planet gear pockets, each of the plurality of planet gears mounted in a respective planet gear pocket about a pin, and the planet carrier characterized by a planet carrier envelope in a range of 2.70 and 4.50, the planet carrier envelope equal to a product of a planet gear pocket aspect ratio multiplied by a planet carrier radial ratio,
        wherein the planet gear pocket aspect ratio is given by $D_p/L$, and the planet carrier radial ratio is given by $D/aw$, wherein $D_p$ is a planet gear pocket diameter of the plurality of planet gear pockets in a circumferential direction, L is a planet gear pocket length of the plurality of planet gear pockets in an axial direction, D is a planet carrier diameter of the planet carrier in a radial direction, and aw is a pin center distance from a longitudinal axis of the planet carrier to a central axis of the pin.

16. The turbine engine of claim 15, wherein the planet carrier envelope is in a range of 3.06 and 4.08.

17. The turbine engine of claim 15, wherein the planet gear pocket aspect ratio is in a range of 1.00 and 1.50.

18. The turbine engine of claim 15, wherein the planet gear pocket aspect ratio is in a range of 1.10 and 1.40.

19. The turbine engine of claim 15, wherein the planet carrier radial ratio is in a range of 2.70 and 3.00.

20. The turbine engine of claim 15, wherein the planet carrier radial ratio is in a range of 2.80 and 2.90.

* * * * *